United States Patent
Keesara

(10) Patent No.: US 8,755,383 B2
(45) Date of Patent: Jun. 17, 2014

(54) USAGE OF MASKED ETHERNET ADDRESSES BETWEEN TRANSPARENT INTERCONNECT OF LOTS OF LINKS (TRILL) ROUTING BRIDGES

(75) Inventor: Srikanth Keesara, Tewksbury, MA (US)

(73) Assignee: Avaya, Inc., Basking Ridge, NJ (US)

( * ) Notice: Subject to any disclaimer, the term of this patent is extended or adjusted under 35 U.S.C. 154(b) by 585 days.

(21) Appl. No.: 13/149,066

(22) Filed: May 31, 2011

(65) Prior Publication Data

US 2012/0243539 A1     Sep. 27, 2012

Related U.S. Application Data

(60) Provisional application No. 61/454,944, filed on Mar. 21, 2011.

(51) Int. Cl.
*H04L 12/28* (2006.01)
(52) U.S. Cl.
USPC ....... 370/392; 370/389; 370/395.53; 370/401
(58) Field of Classification Search
None
See application file for complete search history.

(56) References Cited

U.S. PATENT DOCUMENTS

| | | | |
|---|---|---|---|
| 2004/0264458 A1* | 12/2004 | Six | 370/389 |
| 2007/0047583 A1* | 3/2007 | Assa et al. | 370/471 |
| 2008/0181243 A1* | 7/2008 | Vobbilisetty et al. | 370/406 |
| 2010/0316056 A1* | 12/2010 | Unbehagen et al. | 370/401 |

* cited by examiner

*Primary Examiner* — Hassan Phillips
*Assistant Examiner* — Hicham Foud
(74) *Attorney, Agent, or Firm* — Anderson Gorecki & Rouille LLP

(57) ABSTRACT

Techniques herein include systems and methods that extend functionality of transport networks including Transparent Interconnect of Lots of Links (TRILL) networks. Techniques include using a portion of information within transport device address encapsulation headers for purposes other than identifying source and destination device addresses. The system masks a portion of bits in an address header for an address lookup in forwarding tables of a transport network node. The remaining bits in the address field(s) become free bits that can be used for a variety of application purposes, such as flow identifier selection. By using information fields that already exist in encapsulation headers, such techniques provide additional information without increasing packet size or requiring new protocols. Embodiments can combine Equal-cost multi-path routing (ECMP) functionality, Reverse Path Forwarding (RPF) checks, and Time to live (TTL) protection at the same time.

25 Claims, 14 Drawing Sheets

FIG. 7 — TO STEP 630 IN FIGURE 8

910
RECEIVE A DATA PACKET AT AN RBRIDGE DEVICE WITHIN A TRILL NETWORK, THE DATA PACKET RECEIVED FROM ANOTHER NODE WITHIN THE TRILL NETWORK, THE DATA PACKET HAVING A CUSTOMER NETWORK HEADER ENCAPSULATED BY A TRILL HEADER, THE TRILL HEADER INCLUDING TRANSPORT DEVICE ADDRESS SPACES AND RBRIDGE NICKNAME SPACES

920
IDENTIFY A TRANSPORT DEVICE ADDRESS FROM A TRANSPORT DEVICE ADDRESS SPACE WITHIN THE TRILL HEADER, THE TRANSPORT DEVICE ADDRESS SPACE HAVING A FIRST PORTION OF BITS THAT INDICATES A TRANSPORT DEVICE ADDRESS OF A FIRST DATA SWITCHING DEVICE, AND THE TRANSPORT DEVICE ADDRESS SPACE HAVING A SECOND PORTION OF BITS THAT INDICATES INFORMATION DISTINCT FROM THE TRANSPORT DEVICE ADDRESS OF THE FIRST DATA SWITCHING DEVICE

922
THE TRANSPORT DEVICE ADDRESS SPACE INDICATES THAT THE TRANSPORT DEVICE ADDRESS SPACE USES LOCALLY ADMINISTERED MEDIA ACCESS CONTROL (MAC) ADDRESSES THAT ARE UNICAST ADDRESSES, THE TRANSPORT DEVICE ADDRESS SPACE BEING AN ETHERNET HEADER MEDIA ACCESS CONTROL ADDRESS SPACE HAVING 48 AVAILABLE BITS

924
THE DATA PACKET USES AN ETHERNET HEADER THAT INCLUDES A MEDIA ACCESS CONTROL (MAC) DESTINATION ADDRESS SPACE, AND A MEDIA ACCESS CONTROL (MAC) SOURCE ADDRESS SPACE, THE ETHERNET HEADER USING BITS ACROSS BOTH THE MAC DESTINATION ADDRESS SPACE AND THE MAC SOURCE ADDRESS SPACE TO INDICATE INFORMATION DISTINCT FROM THE DATA SWITCHING DEVICE ADDRESSES

930
EXECUTE A LOOKUP IN A FORWARDING TABLE OF THE RBRIDGE DEVICE BASED ON THE TRANSPORT DEVICE ADDRESS INDICATED IN THE FIRST PORTION OF BITS

932
MASK THE SECOND PORTION OF BITS WITHIN THE TRANSPORT DEVICE ADDRESS SPACE PRIOR TO EXECUTING THE LOOKUP

934
IDENTIFY THE FIRST PORTION OF BITS THAT INDICATES THE TRANSPORT DEVICE ADDRESS OF A FIRST DATA SWITCHING DEVICE BASED ON INFORMATION FROM A VIRTUAL LOCAL AREA NETWORK (VLAN) INDICATOR SPACE OF THE TRILL HEADER

TO STEP 940 IN FIGURE 11

*FIG. 10*

USAGE OF MASKED ETHERNET ADDRESSES BETWEEN TRANSPARENT INTERCONNECT OF LOTS OF LINKS (TRILL) ROUTING BRIDGES

CROSS REFERENCE TO RELATED APPLICATIONS

The present application claims the benefit of U.S. Provisional Patent Application No. 61/454,944, filed on Mar. 21, 2011, entitled "Layer 2 Address Modification," which is incorporated herein by reference in its entirety. The present application is related to U.S. patent application Ser. No. 13/097,224 filed on Apr. 29, 2011, entitled "Usage Of Masked BMAC Addresses In A Provider Backbone Bridged (PBB) Network," which is incorporated herein by reference in its entirety.

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

Computer networks can include various configurations. One such configuration, known as a virtual private network (VPN), is a network that operates over a public communication network (such as the Internet) to provide remote offices or individual clients with secure, private access to a specific network, such as a network specific to an organization or company. VPNs function by encapsulating data transfers between two or more networked devices that are not on the same private network. Such encapsulation keeps transferred data private from other devices on one or more intervening local area networks or wide area networks. A VPN can enable a group of client computers to communicate and access specific resources as members of a given broadcast domain even if the various member client computers are not attached to the same network switch.

Network services, including VPN services are commonly provided using Ethernet technology. Ethernet has become a default Data Link Layer technology for data transport, that is, the default for Layer 2 (L2) of the Open Systems Interconnection (OSI) model. There are several accompanying technologies and protocols that expand Ethernet technologies to other or larger networks. One such protocol is that of Transparent Interconnect of Lots of Links (TRILL). TRILL is a technology designed to provide a transparent mechanism for carrying L2 user traffic though a transport network. TRILL uses nodes or devices, in a transport network, known as Routing Bridges (RBridges). RBridges are devices that support the TRILL specification. TRILL is currently an Internet Engineering Task Force (IETF) draft protocol, the specification of which is accessible from ietf.org (tools.ietf.org/search/draft-ietf-trill-rbridge-protocol-16).

In a TRILL topology, RBridges are separated by a transport network. The transport network could be using a variety of technologies, though Ethernet is technology is the most popular choice for the transport network. When using Ethernet transport between RBridges, forwarded packets carry a TRILL Ethernet header that includes a Media Access Control (MAC) source address (MAC-SA) and a MAC destination address (MAC-DA). A network that uses TRILL can connect customer networks directly through RBridges, or over one or more transport networks, allowing interconnection of multiple RBridges without losing each customer's individually defined Virtual LANs (VLANs). There exist other related technologies that follow a model of a transport network that connects two or more customer networks (access networks), where the transport network is functionally distinct from the customer network, even if a single administrator runs both networks.

SUMMARY

One challenge with transport networks, such as Transparent Interconnect of Lots of Links (TRILL) networks or other networks that use Ethernet encapsulation technology, is extending routing and switching functionality. TRILL networks encapsulate packets (packets that already have at least one encapsulation) before routing such packets across the transport network. Packets are encapsulated at ingress RBridges, partially decapsulated and re-encapsulated at intermediate RBridges, and decapsulated at egress RBridges before continuing to a destination customer network.

Ethernet encapsulation of existing packets (that already have headers) can simplify and accelerate data transport across the transport network, but this can be at the expense of reduced routing functionality. When forwarding a packet between RBridges, it is often desirable to be able to include extra information in the packet that can be used by the RBridges, and even the Ethernet transport devices that receive the packet, to do some efficient processing. For example, if an administrator wanted to add additional features within the transport network, then the administrator would have to configure the transport network so that each node looks deeper within a given packet (examines headers within the encapsulation header). Such additional features can include supporting Equal-cost multi-path routing (ECMP) without incorrectly ordering user flows, identifying specific User-Network Interfaces (non-transport interface of the ingress RBridge), providing Time to live (TTL) information, identifying flow paths, or any extra information or metadata. Having each node execute such deep packet inspection, however, slows down traffic within the transport network, which can cause delays and lost packets. Alternatively, a new routing protocol could be introduced, but a new protocol would require substantial hardware and software updates across all nodes within a transport network, which can be time and cost prohibitive.

Techniques disclosed herein include features and methods that extend functionality of transport networks. Techniques include masking a portion of information within Ethernet address headers. By using an address mask for Ethernet MAC addresses in TRILL headers, the masked bits can be used for purposes other than—or distinct from—addressing. The system limits a number of bits in an address header that should be considered by an RBridge (transport network node) when doing an address lookup in forwarding tables of the RBridge. A subset of address bits is used to identify address information in the TRILL network. The remaining bits in the address field(s) become free bits that can be used for a variety of application purposes. When executing an address lookup, the free bits can be masked or otherwise ignored for address lookups, but used for additional network management or routing operations.

By using information fields that already exist in a TRILL encapsulation header, such techniques provide additional information without increasing packet size. Freed bits in the address fields are not considered address information. Accordingly, the use of these free bits for other purposes does not result in an increase in the number of addresses that need to be stored in forwarding tables. Such a solution does not burden the RBridge and Ethernet transport functionality with excessive implementation complexity.

One embodiment includes an address manager that executes a packet switching process. The address manager receives a data packet at a first data switching device, such as an ingress RBridge of a TRILL network or edge node of a transport network. The data packet has an existing header and is received from a customer network. The address manager encapsulates the data packet using a TRILL header. The TRILL header has a data structure that includes at least a transport device address space and a TRILL device address space. Encapsulating the data packet includes setting a first portion of bits, within the transport device address space, such that the first portion of bits indicates a data switching device address that is a node within the TRILL network. That is, the address manager enters device address information in a subset of the total number of available bits for that device address space. Encapsulating the data packet also includes setting a second portion of bits, within the transport device address space, such that the second portion of bits indicates information distinct from the data switching device address that is a node within the TRILL network. In other words, the second portion of bits can be used as metadata or extra information that is used apart from indicating a device address (source or destination address). Encapsulating the data packet also includes setting bits within TRILL device address spaces such that the bits indicate an ingress RBridge nickname and an egress RBridge nickname. The first data switching device (ingress RBridge) then forwards the data packet via the TRILL network.

In another embodiment, using the TRILL header includes indicating, within a VLAN indicator space of the TRILL header, which bits of the transport device address space indicate the data switching device address, and which bits of the transport device address space indicate the information distinct from the data switching device address. Thus, additional information contained within the VLAN space of the TRILL header can indicate which bits to mask and which bits to use for an address lookup. In another embodiment, additional information is included within the provider address space to identify a flow identifier or provide information for flow path computation.

In another embodiment, the address manager receives a data packet at an RBridge device within a TRILL network, such as an intermediate RBridge, from another node within the TRILL network. The data packet has a customer network header encapsulated by a TRILL header. The TRILL header includes transport device address spaces and RBridge nickname spaces. The address manager identifies a transport device address from a transport device address space within the TRILL header, the transport device address space has a first portion of bits that indicates a transport device address of a first data switching device. The transport device address space has a second portion of bits that indicates information distinct from the transport device address of the first data switching device. The address manager executes a lookup in a forwarding table of the RBridge device based on the transport device address indicated in the first portion of bits. The RBridge then replaces the first portion of bits, that indicates the transport device address of the first data switching device address, with bits that indicate a second data switching device address while maintaining the second portion of bits unchanged. Thus, the RBridge modifies only a portion of the bits within the transport device address space, while leaving the remaining portion unchanged or copied exactly to another TRILL header instance used to forward the data packet. The RBridge then forwards the data packet via the TRILL network.

Techniques disclosed herein can also support Equal-cost multi-path routing (ECMP) by providing hop-by-hop path selection (next node selection) without increasing packet overhead or requiring deep packet inspection.

In one embodiment, the address manager receives a data packet at a first data switching device. The data packet has an existing header and is received from a customer network. The first data switching device is an edge node of a transport network. Such an edge node could be an ingress RBridge of a TRILL network, Backbone Edge Bridge of a Provider Backbone Bridged (PBB) network, etc. The address manager encapsulates the data packet using a transport network header. The transport network header has a data structure that includes a transport device address space and, optionally, a virtual local area network (VLAN) indicator space. Encapsulating the data packet includes setting a first portion of bits within the transport device address space, such that the first portion of bits indicates a data switching device address that is a node within the transport network. The address manager generates a flow identifier by using packet information from the existing header as computation input for generating the flow identifier, such as by hashing on underlying customer information. Encapsulating the data packet includes setting a second portion of bits within the transport device address space, such that the second portion of bits indicates the flow identifier. The data switching device selects a forwarding path to a next-hop node of the transport network by using the flow identifier from the transport device address space as computational input for selecting the forwarding path. The data switching device then forwards the data packet to the next-hop node in the transport network using the selected forwarding path. Subsequent nodes can then use the flow identifier for next-hop selection. Subsequent nodes can also provide Reverse Path Forwarding (RPF) checks and Time to live (TTL) functionality.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a data packet at a first data switching device, the data packet having an existing header and being received from a customer network, the first data switching device being an ingress RBridge of a TRILL network; encapsulating the data packet using a TRILL header, the TRILL header having a data structure that includes a transport device address space and a TRILL device address space; encapsulating the data packet includes setting a first portion of bits, within the transport device address space, such that the first portion of bits indicates a data switching device address that is a node within the TRILL network; encapsulating the data packet includes setting a second portion of bits, within the transport device address space, such that the second portion of bits indicates information distinct from the data switching device address that is a node within the TRILL network; encapsulating the data packet includes setting bits within TRILL device address spaces such that the bits indicate an ingress RBridge nickname and an egress RBridge nickname; and forwarding the data packet via the TRILL network. Alternatively, another particular embodiment of the present disclosure is directed to a computer program product that includes one or more non-transitory computer storage media having instructions stored thereon for supporting operations such as: receiving a data packet at a first data switching device, the data packet having an existing header and being received from a customer network, the first data switching device being an edge node of a transport network; encapsulating the data packet using a transport network header, the transport network header having a data structure that includes a transport device address space and a virtual local area network (VLAN) indicator space; encapsulating the data packet includes setting a first portion of bits within the transport device address space, such that the first portion of bits indicates a data switching device address that is a node within the transport network; encapsulating the data packet includes setting a second portion of bits within the transport device address space, such that the second portion of bits indicates a flow identifier; selecting a forwarding path to a next-hop node of the transport network by using the flow identifier from the transport device address space as computational input for selecting the forwarding path; and forwarding the data packet to the next-hop node in the transport network using the selected forwarding path. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting packet switching and routing. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIGS. 9-11 are flowcharts illustrating an example of a process supporting TRILL header address masking according to embodiments herein.

DETAILED DESCRIPTION

Techniques disclosed herein include systems and methods that extend functionality of transport networks. Techniques include adding extra information—distinct from device source and destination addresses—within transport device address spaces of TRILL headers that encapsulate data packets. This extra information within Ethernet Media Access Control (MAC) or similar address spaces is used for purposes separate from device addressing. For example, the extra information can be used for equal-cost multi-path routing (ECMP), identifying specific User-Network Interfaces, providing time to live (TTL) information, indicating flow IDs, flow paths, or for any other data transport management purpose. The system limits a number of bits in an address header that should be considered by an RBridge (transport network node) when doing an address lookup in forwarding tables of the RBridge. A subset of address bits is used to identify address information in the TRILL network. The remaining bits in the address field(s) become free bits that can be used for a variety of application purposes. When executing an address lookup, the free bits can be masked or otherwise ignored for address lookups, but used for additional network management or routing operations.

Techniques disclosed herein can be used with any network that has a functional difference between a customer/access network and a provider/transport network, and with the transport network using an encapsulation process for transporting data across the transport network. For convenience in describing features and embodiments herein, the following disclosure will primarily describe various embodiments in the context of Transparent Interconnect of Lots of Links (TRILL) technology, though it will be clear to persons skilled in the art how these techniques can be applied to additional and comparable networking technologies, such as that of Provider Backbone Bridges (PBB) or IEEE 802.1ah and Shortest Path Bridging (SPB) or IEEE 802.1aq.

A network that uses IEEE 802.1ah can route a customer network over a provider's network allowing interconnection of multiple Provider Bridge Networks without losing each customer's individually defined Virtual LANs (VLANs). Another such protocol is that of Shortest Path Bridging or IEEE 802.1aq. A network that uses IEEE 802.1aq can advertise both topology and logical network membership. Packets are encapsulated at an edge node either in Mac-in-Mac 802.1ah or Q-in-Q 802.1ad frames and transported only to other members of the logical network. IEEE 802.1aq supports unicast and multicast, and all routing is on symmetric shortest paths. IEEE 802.1aq includes Shortest Path Bridging MAC (SPBM) functionality.

Figure 1A:
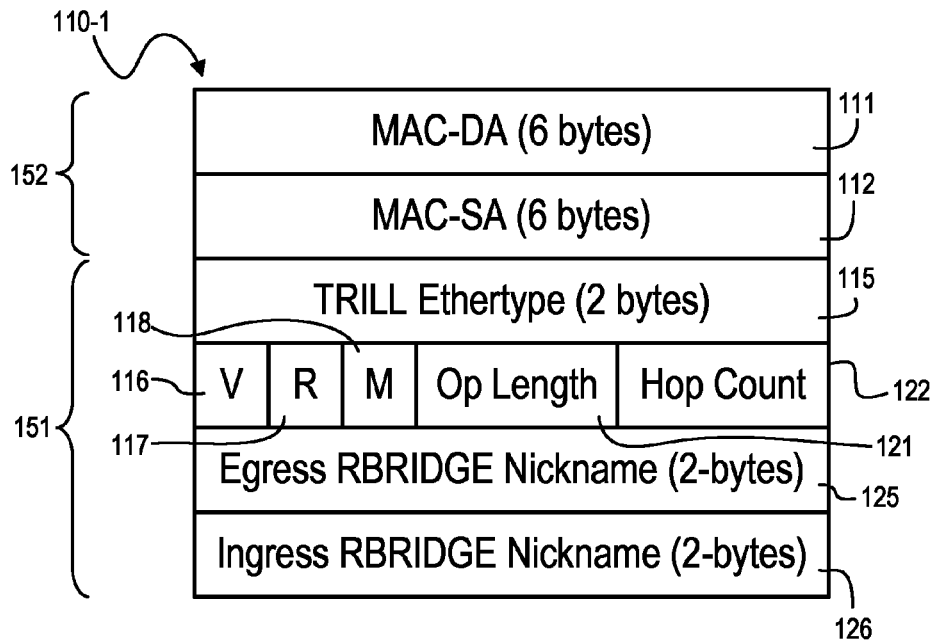
FIGS. 1A and 1B are a diagram showing a conceptual representation of a data structure of a TRILL network Ethernet header.
Figure 1B:
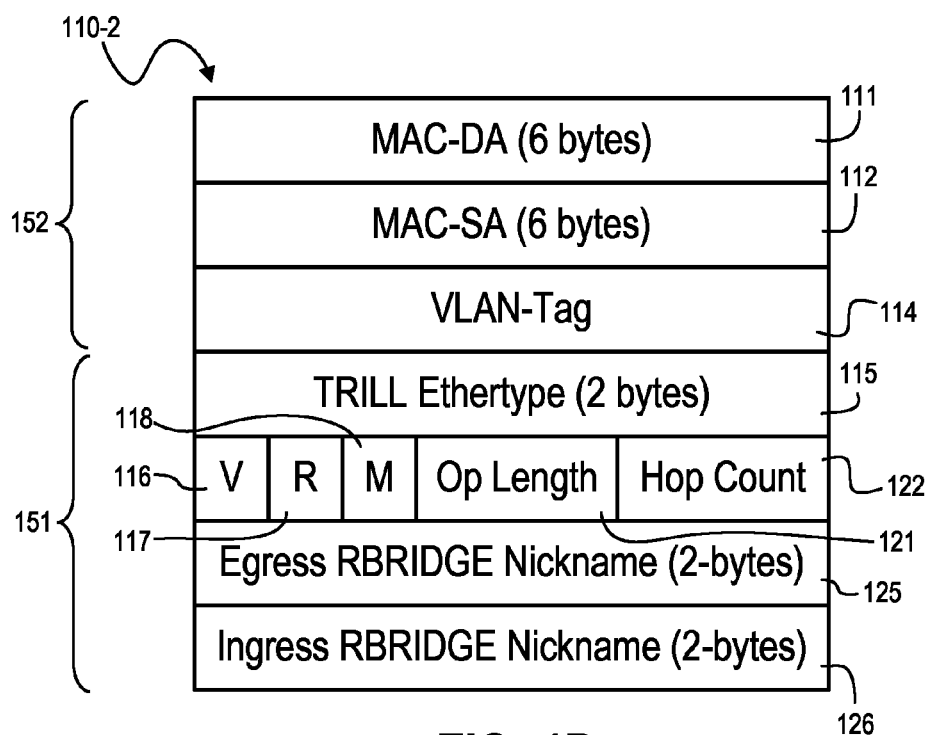

A TRILL network is a L2 network that uses Ethernet encapsulation to transfer user L2 traffic between two or more L2 networks that are located at the edge of the TRILL network (transport network). Using TRILL encapsulation, an ingress RBridge encapsulates a data packet received from a customer network with an Ethernet header for use in the TRILL network. FIGS. 1A and 1B illustrate components of such an example encapsulation header 110. Header 110-1 shows several header fields. Note that such encapsulation headers can contain additional fields beyond what is shown in FIG. 1A. Field 111 is a MAC destination address header (MAC-DA). The destination address field contains six bytes (48 bits) of data. Field 112 is a MAC source address header (MAC-SA). The source address field contains six bytes (48 bits) of data. Field 115 contains two bytes of data used for a TRILL Ethertype Tag. Field 116 is used to identify a particular Trill version being used (2 bits). Field 117 is a 2-bit field that is reserved for future use. Field 118 indicates whether there are multiple destinations (1 bit) such that the frame (packet) is to be delivered to a class of destination end stations via a distribution tree and that the egress RBridge nickname field specifies this tree. Field 121 is a length of option (5 bits) used to indicate an optional capability and to encode information into the header in connection with that capability. Field 122 is a hop count field used for Time to Live (TTL) functionality, and has 6 bits. An RBridge drops frames received with a hop count of zero, otherwise it decrements the hop count. Field 125 is an Egress RBridge Nickname (2 bytes), and field 126 is an Ingress RBridge Nickname (2 bytes). RBridge Nicknames are 16-bit dynamically assigned quantities that act as abbreviations for RBridges' IS-IS (Intermediate System To Intermediate System) IDs to achieve a more compact encoding, and to be used to specify potentially different trees with the same root. Basically, fields 125 and 126 indicate an RBridge source address (RBridge-SA) and an RBridge destination address (RBridge-DA). Header 110-2 is like header 110-1, except that header 110-2 is a tagged Ethernet header in that header 110-2 includes VLAN tagging. Specifically, field 114 is a VLAN-Tag that includes a VLAN ID and a priority. Note that TRILL headers segregate addressing into TRILL addressing and transport network addressing. This is because during forwarding operations, certain fields are swapped or replaced at certain nodes, while other fields remain the same. Fields identified with bracket 151 indicate Trill addressing fields that remain unchanged when forwarded by an intermediate RBridge or other forwarding node. Data within fields identified with bracket 152 are changed by intermediate RBridges during forwarding operations, as will be explained below. The changed data is from fields used for transport network addressing (Ethernet in this specific example).

Figure 2:
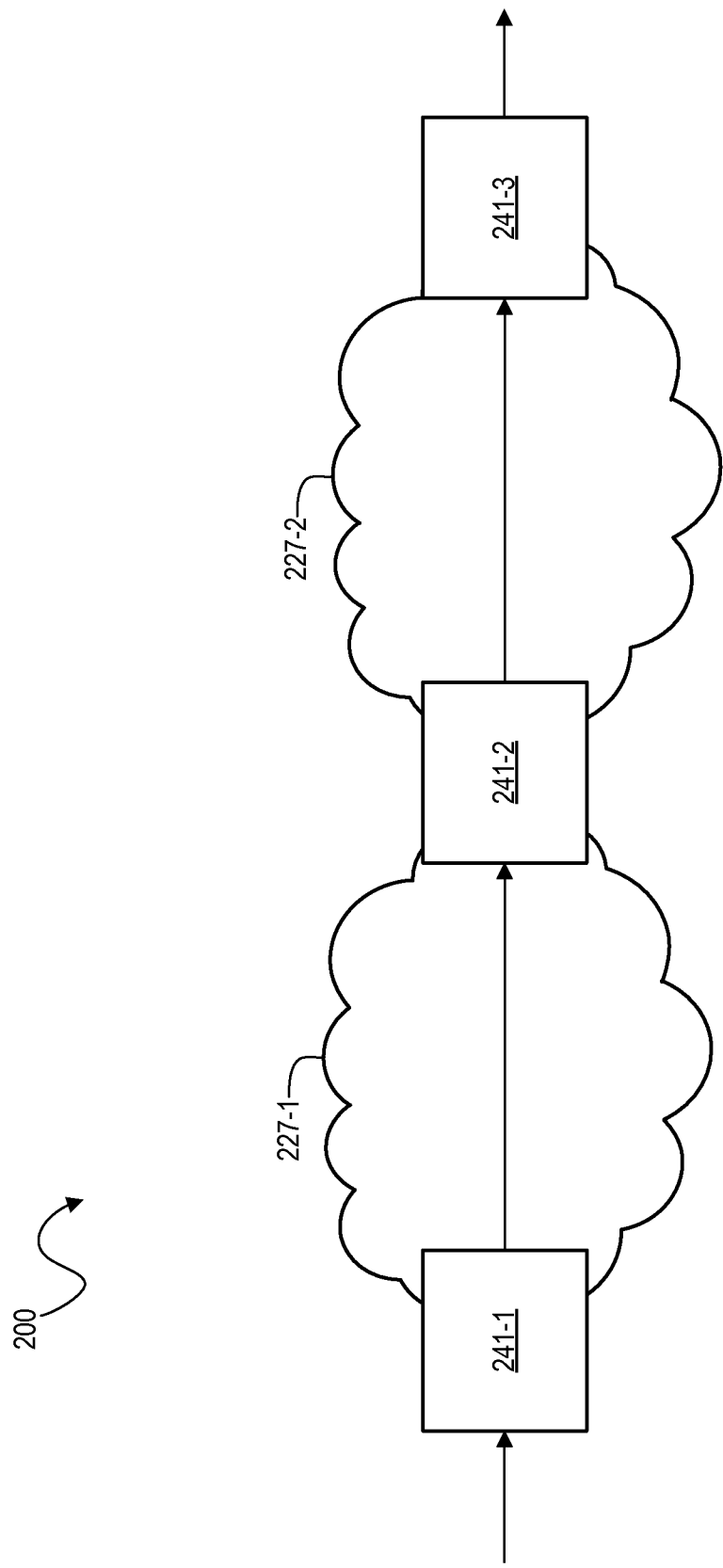
FIG. 2 is a network diagram of a TRILL network.

Referring to FIG. 2, a TRILL network 200 includes RBridges 241. In this example, node 241-1 is an ingress RBridge, node 241-2 is an intermediate RBridge, and node 241-3 is an egress RBridge. In this simplified example diagram, a data packet is being transmitted through Trill network 200 from left to right. Note that RBridges in the TRILL network can have intervening networks 227-1 and 227-2, which can be use Ethernet based L2 bridging networks capable of using local MAC addresses. When forwarding, RBridge 241-1 add an encapsulation header with the MAC destination address being the MAC address of RBridge 241-2 in network 227-1, and a MAC source address of RBridge 241-1 in network 227-1. A VLAN tag recognized in network 227-1 connecting 241-1 and 241-2 may be required. The encapsulation header also includes an ingress RBridge nickname of RBridge 241-1 and an egress RBridge nickname of RBridge 241-3. Network 227-1 then delivers the encapsulated data packet to RBridge 241-2 using conventional Ethernet bridging to the MAC-DA of RBridge 241-2. RBridge 241-2 then forwards the encapsulated data packet to RBridge 241-3 and changes the encapsulation header by replacing the MAC-DA of RBridge 241-2 in network 227-1 with a MAC address of RBridge 241-3 in network 227-2, and by replacing the MAC-SA of RBridge 241-1 in network 227-1 with the MAC address of RBridge 241-2 in network 227-2. Any VLAN tag is then removed or replaced with a VLAN tag recognized in network 227-2 as a VLAN connecting RBridge 241-2 and RBridge 241-3. Network 227-2 then delivers the encapsulated data packet to RBridge 241-3 using conventional bridging to the MAC-DA of RBridge 241-3.

When forwarding a packet between RBridges through an Ethernet transport network, currently all 48-bits of both MAC addresses (source and destination) are used to determine whether or not to forward the packet and also to determine which outgoing interface to forward the packet on. When forwarding a packet between RBridges, it is often desirable to be able to include extra information in the packet that can be used by ingress/egress RBridges and/or intermediate RBridges that receive the packet as a means for efficient processing.

TRILL technology has differences compared to other encapsulation technology for transport networks. For example, with PBB networks, a PBB encapsulation header remains the same from one end of the PBB network another end of the PBB network, that is, from edge node to edge node. With TRILL networks, however, the MAC-SA, MAC-DA, and VLAN-tag are replaced at every hop (node that is an RBridge node). In other words, each time a TRILL packet is forwarded by an intermediate RBridge device, the intermediate RBridge keeps a portion of the encapsulation header (typically fields 115, 116, 117, 118, 121, 122, 125, and 126), but changes or replaces a portion of the encapsulation header (fields 111, 112, and 114). Thus, an intermediate RBridge decapsulates and re-encapsulates a TRILL header such that a first portion of fields remain the same and a second portion of fields are changed. The MAC-SA and MAC-DA fields can change from one hop to another because the TRILL header includes separate fields for source and destination TRILL devices (fields 125 and 126). Although the MAC-SA and MAC-DA are lost at every hop, the TRILL header is still carrying a TRILL device header from an ingress RBridge to an egress RBridge.

TRILL functions by broadcasting connectivity among RBridges so that each RBridge knows about all the other RBridges, and the connectivity between them for maintaining forwarding tables. TRILL can also function with transport networks that are not Ethernet based. In other networks, such as Multiprotocol Label Switching (MPLS), different fields will be used instead of MAC-SA/MAC-DA, but the TRILL header portion remains the same. By breaking up the TRILL header into two pieces, TRILL can have a separate transport network between any two RBridges. The Ethernet portion of the header then effectively only identifies a next hop RBridge, while the RBridge-DA/RBridge-SA indicates initial and final destinations. Thus, the transport addressing is not end-to-end address, but is instead next-hop addressing.

In embodiments herein, the MAC-SA and MAC-DA fields themselves of TRILL headers are structured to carry a masked and a non-masked portion of bits. At intermediate RBridges during forwarding of TRILL packets, a masked portion of a the MAC-SA and/or MAC-DA remains the same (or carried across), while the non-masked portion is swapped or changed according to the forwarding RBridge. In other words, a portion of the MAC-SA/MAC-DA remains the same, while a portion is changed during forwarding at an intermediate RBridge.

The MAC-DA and MAC-SA in the TRILL headers are 48 bits each, allowing for a full "2 to the power 48" (2 raised to the 48th power) addresses in the TRILL network. Essentially, TRILL uses 48 bits to get across one link, that is, to get from one hop to another hop. This is an extremely large number. A large number of addresses is unlikely to be deployed in an actual TRILL network. Indeed, in practice, the number of addresses needed for such next hop operation is two or three addresses. Such next-hop addressing can be accomplished by using just three to five bits or so. The system herein uses this discovery by limiting the number of bits in the address space/field that should be considered by the RBridge when doing a next hop forwarding lookup operation. For Ethernet transport networks, this involves operations using the MAC-DA/MAC-SA and VLAN-Tag. Thus, a relatively small subset of the 48-bits of the address space is used to identify device address information in the TRILL network, that is, for the intended use of the address field, while the remaining bits can be used to transparently pass information between RBridges. Any scheme can be used for selecting the size and configuration of the subset used for next-hop TRILL addressing. For example, a simple rule using a fixed number like the first 5 bits or the first 6 bits of the address information could be used. Other variations are also possible. There are multiple uses for the remaining bits. The remaining bits are identified as masked bits, that is, bits designated to be masked or ignored during forwarding table lookups and carried over (kept) during re-encapsulation of the addressing headers. These remaining masked bits in the two address fields (MAC-SA and MAC-DA) can then be considered as free bits that can be used for a variety of application purposes.

By using information fields that already exist in the TRILL encapsulation header, packet size is not increased. Bits within the MAC-DA and MAC-SA that have been freed up for distinct application uses are not considered address information. Accordingly, use of these free bits for other purposes does not result in an increase in the number of addresses that need to be in the (VLAN-ID,MAC) forwarding tables. Moreover Connectivity Fault Management (CFM) (IEEE-802.1ag) is not compromised, because the selection of forwarding paths by RBridges is still only limited to the VLAN-ID, MAC-DA and MAC-SA fields. As far as implementation of such techniques, several conventional silicon and Network Processing Unit (NPU) that do the TRILL lookup based forwarding already have the ability to mask a portion of the MAC address while doing a lookup. Embodiments are not limited to a specific number of address bits that should be masked in the (VLAN-ID,MAC-DA) and (VLAN-ID,MAC-SA) lookups. Instead, embodiments include address bits that are not used in a source or destination device address lookup that are used for other creative and beneficial application uses (such as ECMP). Support for such functionally can be implemented via a version update to TRILL, or a data path implementation update.

Various embodiments can determine a number of bits to mask or bits that are distinct from address bits. A large enough (several bits) encoding of the packet "entropy" stored at a fixed location in the packet can used to support ECMP without erroneously ordering user flows. Other embodiments can provide an ability to convey information about the incoming non-TRILL network interface on the ingress RBridge and the outgoing non-TRILL network interface of the egress RBridge. Other forms of meta-data that may be of interest to the ingress and egress RBridges, but should be ignored by intermediate RBridges, can also be included. Such techniques provide extensible functionality with no increase in packet overhead, without requiring a RBridge to support larger (VLAN-ID,MAC) based forwarding records, without compromising CFM to effectively test all forwarding paths that might be used by user data frames, and without burdening the RBridges with excessive implementation complexity.

Figure 3:
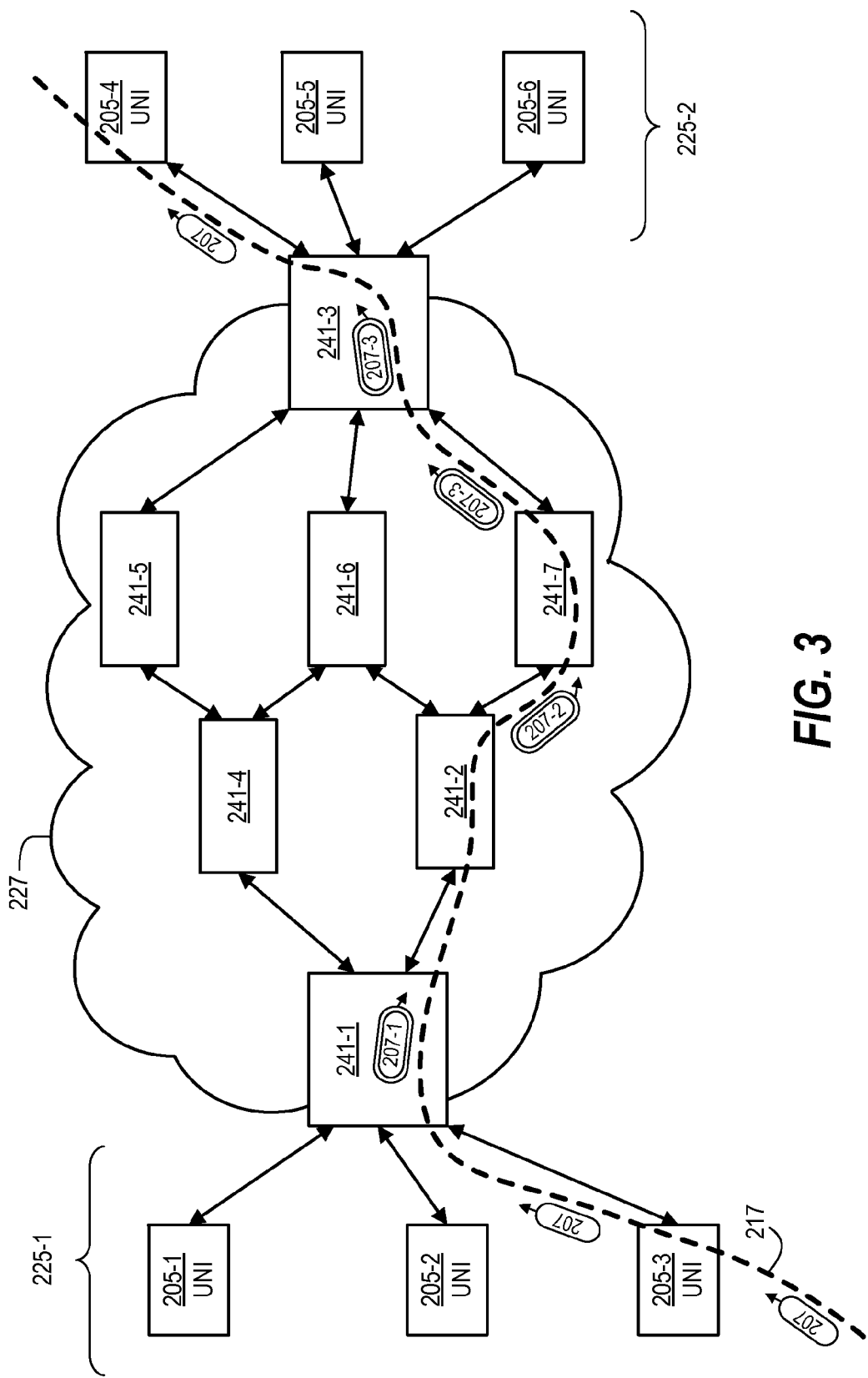
FIG. 3 is a network diagram of a TRILL network according to embodiments herein.

One general networking objective is to keep forwarding tables small for better scaling. In a TRILL network, or other transport network that has a hierarchical addressing scheme, the network is typically structured as a transport network that connects two a more customer (access) networks. FIG. 3 shows customer networks 225-1 and 225-2. Note that customer network 225-1 includes User-Network Interfaces (UNIs) 205-1, 205-2, and 205-3, while customer network 225-2 includes User-Network Interfaces (UNIs) 205-4, 205-5, and 205-6. Note that the transport network can be provided by a single administrator or by multiple administrators. Also note that the transport network and the customer network can also be provided by a single administrator, but are nevertheless functionally treated or identified as separate networks. With such a network configuration (transport network connecting two or more customer networks), the transport network has added or defined an encapsulation layer such as TRILL encapsulation. Upon receiving a given frame at the interface between the first access network and the transport network, a TRILL RBridge encapsulates the customer frame within the TRILL encapsulation header of the addressing scheme. In FIG. 3, data packet 207 (customer packet) is received at ingress RBridge 241-1 from UNI 205-3. Ingress RBridge 241-1 encapsulates packet 207 with an Ethernet encapsulation header (or similar encapsulation header). The encapsulated packet is now represented as packet 207-1. Ingress RBridge 241-1 then forwards packet 207-1 along flow path 217 through TRILL network 227. Note that flow path 217 can represent an arbitrary flow path or a deterministic flow path depending on packet instructions. Packet 207-1 next arrives at intermediate RBridge 241-2. Intermediate RBridge 241-2 then swaps out a portion of the TRILL header. Specifically, information in the transport device address space. According to embodiment disclosed herein, however, intermediate RBridge 241-2 maintains (copies or carries over) bits within the transport device address space that are masked or indicated distinct from transport device addressing. For example, Network 227 (or 227-1 and 227-2) recognizes the top eight bits for addressing, while masking the bottom 40 bits so that it can pass an additional 80 bits of information between edge nodes. This modified TRILL header is now identified as data packet 207-2. The same procedure happens at intermediate RBridge 241-7, with the modified TRILL header now indicated by data packet 207-3. Data packet 207-3 is next received at egress RBridge 241-3. Egress RBridge 241-3 then decapsulates packet 207-3 and forwards the original packet 207 within customer network 225-2.

The TRILL encapsulation header can include the source address of the customer network 225-1 and the destination address of the second customer network 225-2. Each address is a full 48-bit address. Essentially, TRILL functionality adds an addressing layer on top of an existing frame to hide underlying addresses from the transport network devices within the TRILL network and any intervening networks. Thus, routers and switches within the transport network do not see the underlying addresses of packets when using the TRILL protocol. In practice, the number of customer devices can be in the millions or more, thus having to maintain forwarding tables for every customer device at each data switching device within the transport network would significantly increase processing of each transport device and significantly slow forwarding operations because of the numerous lookups required. A TRILL, as a solution, creates an addressing scheme within the transport network. Transport networks are different from customer networks because transport networks typically have significantly fewer devices. While customer networks can have tens of millions of addresses, large transport networks often have 1000 to 2000 device addresses or less. Since TRILL is typically not an end-to-end addressing scheme for the transport device address spaces, then the number of address used by any given RBridge can be as little as just a few transport devices. TRILL then uses a different addressing scheme within the TRILL network as compared to the customer networks. Addresses within the transport network are addresses of devices within transport network 227 itself as opposed to end user device addresses.

The TRILL addressing scheme is similar to that of Ethernet in that the source and destination address fields for transport devices (typically RBridges) provide 48 bits of data. Note that TRILL uses a separate address space for RBridge ingress/egress nicknames. Conceptually, this means that each address field of the transport device space in the TRILL header can identify 2^48 addresses (2 raised to the 48th power). A conventional TRILL network cannot use that many address, and, indeed, typically uses only a few to dozens of addresses. There is no requirement that these transport addresses be globally administered. Accordingly, it is possible to have very flexible administration schemes, including complete freedom in assigning addresses. More specifically, it is possible to have locally administered addresses, as opposed to having to purchase addresses from a regulatory body. For example an administrator would not need to acquire MAC addresses from IEEE or IETF or otherwise purchase MAC addresses. Using locally administered addresses in combination with a relatively small number of transport devices within a given transport network means that the required number of device addresses is several orders of magnitude smaller than the address space potential. By using only a portion of bits of an address space sufficient to identify an expected total number of transport device addresses, the remaining bits can be considered as free bits available for many different purposes.

With such locally administered addresses, and with the total number of such addresses typically in the hundreds to a couple thousand, there is a lot of data potential within each transport device address space of the TRILL header. In other words, there is a lot of information potential merely to carry about three to 1000 addresses. Techniques disclosed herein exploit this information potential by providing a masked address format of one or both 48-bit address spaces in the TRILL header. Such a technique preserves the TRILL addressing structure so that network processing units, hardware, and other components used for address forwarding can still function as-is, without any hardware upgrades.

In one embodiment, the system administers the source and destination address spaces in a TRILL header as locally administered. The system then reserves a portion of the address space for locally administered transport devices to indicate the actual devices in the transport network (typically switches and routers). This technique frees up the remaining bits, or bits in the remaining portion not reserved for transport device addresses, to be used for other purposes. Such purposes can include non-address purposes. The system provides remaining bits for other uses without increasing a number of forwarding records maintained at each transport device within the transport network. Without masking or otherwise indicating that the freed up bits are not to be used in the forwarding tables, the forwarding tables would dramatically increase because every time a transport device identifies a new address, that address would need to be added to respective forwarding tables.

In one technique, the system can instruct each transport device to use masked forwarding. The system can execute masking using various techniques. For example, for an address space that contains 48 bits, 10 of those bits might be used for transport device addressing, while the remaining bits are used for other purposes. In one masking technique, the remaining bits are converted to zeros when executing a given lookup in a forwarding table. Thus, despite various different uses of the remaining bits, the forwarding lookup operation will ignore these remaining bits. This results in fewer variations and combinations of lookup key values, thereby providing or maintaining small forwarding tables.

Note that the selection of bits used for transport device addressing as compared to bits used for other purposes can be selected according to design. For example, a simple scheme designates the top 24 bits for addressing, and the lower 24 bits for other purposes. Alternatively a random or pseudorandom selection of bits can be used for addressing while all the remaining bits are used for other functional purposes. In another example, the available bits can be segmented with each segment used for a different purpose (one segment being used for transport device source/destination addressing). Such a technique provides additional routing and forwarding functionality without defining a new encapsulation protocol and without blowing up the size of forwarding tables. The actual number of bits used for transport device address can depend on the expected number of total devices within the transport network. For example 12 non-masked bits within the address space (including locally administered and unicast designation bits) would provide about 1024 addresses. Too few address bits would limit the number of nodes that can participate in the TRILL network, while too many non-masked bits would waste address bits.

When a given transport device within a transport network receives a packet having a modified TRILL header (MAC address plus additional data), the given transport device (typically an RBridge) can function by masking a portion of the bits within the address space (such as by zeroing the values) prior to performing an address lookup, while leaving other bits within the address space as is. In other implementations, a forwarding table itself (executing in the forwarding data plane of the transport device) can have masking capabilities so that even if the full 48 bits are passed to the forwarding table, as soon as the forwarding table finds a match on the first 24 bits (or other amount of bits) the forwarding table stops trying to match the surplus bits. In other words, the forwarding table can search for the longest prefix match or longest set of bits in the address space that matches an address in the forwarding table.

Thus, in one case, a given transport device knows or identifies that an address space is using a specific or fixed mask size. In this case the device can apply a mask in advance on the Mac address bits and then do a lookup. In other embodiments, the device may not know the exact size of the mask, and so will then execute a lookup to find the longest sequence of bits that match, and then the remaining bits outside the longest match can be treated as entropy bits or ECMP bits, or bits for other forwarding functionality. In either example, bits in the packet address fields can remain the same and not modified during the forwarding process. This technique can provide additional forwarding functionality (such as flow information) without requiring transport devices to look deeper into packets and without increasing the size of forwarding tables.

Packet flow identifiers (IDs) are also possible with the system. To use flow IDs without techniques disclosed herein, the transport device would need to look deeper into packets and identify user fields and then generate a flow ID and then use that generated flow ID to select a path. This conventional approach undesirably requires a transport device to look deep into packets and also to do protocol specific inspections. By looking deeper into a given packet, the transport device is taking on the responsibility of knowing what each field within an inner header means. Techniques disclosed herein, however, focusing on address information that is uniformly described, and such address information can be perpetually extensible. For example, a solution that requires a new protocol means that each transport device needs to be updated, reconfigured, or otherwise replaced to be able to understand the new protocol. This is not a desirable solution with hundreds of transport devices within a given transport network. With techniques disclosed herein, the system extracts this information into the address field of an existing header. Each core node can then execute masked forwarding, and can use the non-masked bits for hashing and generating flow IDs, without looking deeper into underlying packet headers.

Figure 4A:
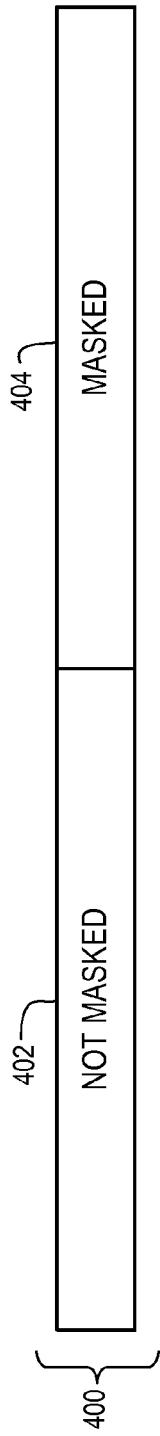
FIGS. 4A, 4B, and 4C are diagrams illustrating example divisions within an transport device address header, according to embodiments herein.

In one embodiment, bits can be masked in a unicast MAC. In this embodiment, the system uses locally administered unicast MAC addresses by setting Bit 41 on the MAC to "one" to indicate that the MAC address is locally administered and then setting Bit 40 of the MAC is to "zero" to indicate that it is a unicast address. The system then masks a subset of 48-bits of the unicast MAC for the purpose of address recognition/lookups. The value of the masked bit is ignored for the purpose of determining address matches. Bit 41 (locally administered bit) and Bit 40 (multicast bit) are not masked. FIG. 4A shows an example division of the addressing space 400. Note that portion 402 and portion 404 are approximately equal in size. In address space 400, portion 302 can contain a transport device address and thus remain non-masked, while an equal portion (24 bits) are masked (intended for purposes other than source/destination addressing). This opaque information can be customized for use with any number of applications.

Figure 4B:
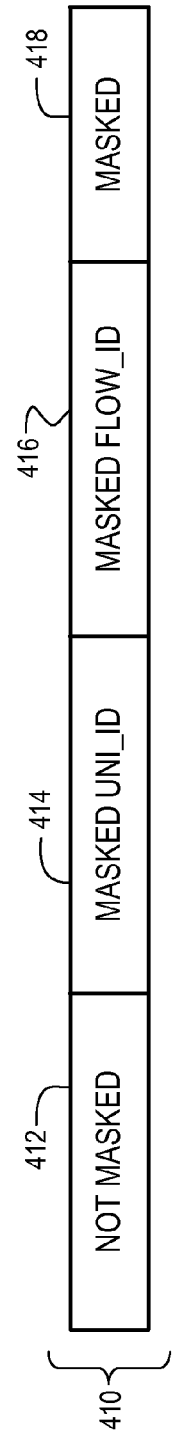
Figure 4C:
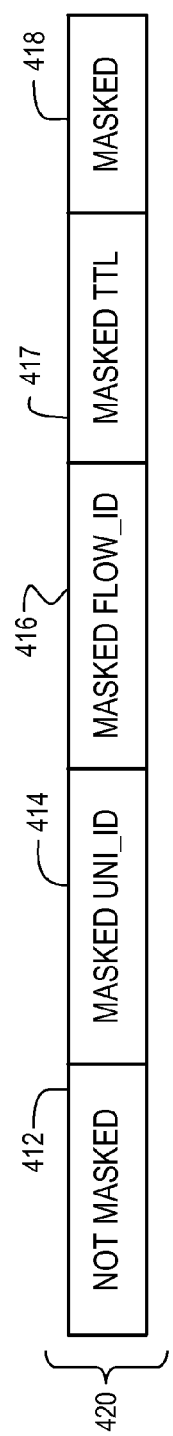

FIG. 4B shows another non-limiting example division of addressing space 410. Portion 412 is not masked. Portion 414 is masked and carries a User-network interface ID. Portion 416 is masked and carries a Flow identifier, and portion 418 is masked to carry any other data. FIG. 4C is similar to FIG. 4B, except that addressing space 420 also includes portion 417 for carrying time to live (TTL) information or hop count.

Returning to FIG. 3, all nodes within transport network 227 can be assigned MAC addresses that are unique in the top 8 bits, with the lower 40 bits considered free or masked. Ingress RBridge 241-1 encapsulates packet 207-1 by masking the lower 40 bits of a MAC address. When packet 207-1 arrives at intermediate RBridge 241-2, intermediate RBridge 241-2 recognizes the top eight bits of the MAC-DA as the address of ingress RBridge 241-2 (The TRILL RBridge nickname destination address space is used to identify egress RBridge 241-3). Intermediate RBridge 241-2 recognizes the lower eight bits of MAC-SA as the address of ingress node 241-1, and then forwards packet 207-2 to intermediate RBridge 241-7. From there intermediate RBridge 241-7 forwards to egress RBridge 241-3. Thus, node 244-1 only needs to know three MAC addresses in its forwarding tables, but can pass an additional 80 bits of data from node 241-1 to node 241-2. In another embodiment, a predetermined number of top bits and a predetermined number of bottom bits can be masked, while a central portion of bits is not masked.

One example use of free address space bits is for transmitting User-Network Interface (UNI) IDs or other customer network information. Note that in FIG. 3, edge node 241-1 connects with multiple UNIs 205 from customer network 225-1. In some situations, it is important to know which interface (which UNI) a given packet is received from at the ingress RBridge 241-1. One way to do this is for the ingress RBridge to create a separate address for each distinct UNI, but this approach increases the number of addresses that would be kept in forwarding tables because additional transport devices can identify the UNI addresses and have to add these UNI addresses to their respective forwarding tables. In one embodiment the system does not treat these UNIs as separate addresses, but instead adds a representative value in the masked portion of the MAC address field. While the edge nodes need to manage identifications of each UNI, if such identifications were passed as fully qualified addresses, forwarding tables of intermediate nodes would fill-up. With freed up bits, the system can copy a UNI-ID into a masked portion of the MAC address. The intermediate transport devices are not concerned about the UNI-ID, but when the packet arrives containing the UNI-ID number as masked data within the MAC address field, the receiving egress RBridge can then extract that UNI ID information for forwarding purposes. This keeps forwarding tables small while being able to pass UNI information across the transport network. By treating some bits as opaque and assigning a meaning to them, the system can transparently transfer this information across the transport network, and the meaning and interpretation can be completely dependent on the edge node devices instead of the core node transport devices.

In another embodiment, the edge nodes or core nodes (transport devices) can use the masked UNI-information for path selections. For example transport nodes do not use the UNI-ID information (in the MAC address space) for table lookups, but instead use this information for hashing operations. Such a technique can enable ECMP or path functionality within the TRILL network without blowing-up the size of the forwarding tables or requiring a separate protocol. In another example, a maximum number of bits can be freed up across the address spaces of the MAC headers, to convert the TRILL network to a single switch network fabric architecture to control egress interfaces.

By way of a non-limiting example, packet 207 entering on UNI 205-3 at edge node 241-1 needs to eventually be forwarded to UNI 205-4 at edge node 241-2. In a conventional system, a packet forwarded from edge node 241-1 to edge node 241-2 might do a deep inspection of the packet to identify the destination UNI. With techniques disclosed herein, however, the UNI destination address can be masked within the TRILL header so that no deep packet inspection is necessary at edge node 241-2. This is the principle of doing a masked UNI-ID. This technique can be used both in the forwarding and in the learning process. For example, edge node 241-2 can learn packets associated with edge node 241-1 and UNI 205-3. In another embodiment, the user network interfaces can also be identified locally, thereby minimizing the number of bits needed in the address space to accurately identify user network interfaces attached to each RBridge.

Equal-cost multi-path routing (ECMP) or flow IDs have an objective to create a single flow path from one end user to another end user so that certain data flows are not broken. Without designating a flow path, a transport network has multiple potential data paths that can be selected based on load-balancing or other criteria. Certain data transmissions, however, should be sent along a single flow path. When certain flows are broken across multiple paths the packets that are part of the flow can arrive at different times. For example, the receiving device may receive the fifth packet sent before receiving the third packet sent. When this happens, the receiving end user device may drop those packets and request retransmission, which then degrades the performance of the network.

Flows and flow IDs have an objective that, if it is possible to indicate to a network what constitutes a flow, then that flow should not be broken across multiple paths, this flow should be executed without requiring deep inspection within a given packet (that is, inspecting header information within the encapsulation header). ECMP can be important because as a given network grows linearly, the potential flow paths can increase exponentially. Because of this, computing paths in advance is computationally not practical or not possible. ECMP enables using all paths in the network while keeping a computational load very small. ECMP is especially beneficial in data centers or networks having lots of links and nodes, or servers that provide a multiplicity of end user sessions.

In conventional ECMP techniques, transport devices inspect underlying header fields such as identifying IP source address, IP destination address, transmission control protocol, User Datagram Protocol (UDP), and other fields, and then do hashing operations on these fields to ensure that all packets having the same IP source, IP destination, and UDP information go along the exact same path. The hashing operation converts the unique IP header information into a small number that is used for path selection or flow path identification.

Thus for transport devices to execute ECMP, each transport device must understand underlying protocols, understand how to decode a given packet, and be able to select the correct numbers as computational input to create a flow path ID. Such a technique is not desirable within the transport network. If every node within a transport network is required to do such deep or complex processing, such processing is going to slow down the network. Additionally, as a given underlying protocol changes, and a transport device does not know how to correctly process the new protocol, then flow IDs may be incorrectly selected. Conventional techniques to address this issue attempt to create a new address space within an encapsulation header that identifies a particular flow ID so that only the edge nodes need to understand all the different protocols, and the transport devices within the transport network can be considered dumb devices. In other words, conventional techniques attempt to create a new header entry that explicitly identifies a flow ID. Adding an explicit flow ID can help when underlying packets contain encrypted information that transport devices may not know how to read to generate a flow ID, but this increases packet overhead.

Techniques disclosed herein, however, can support deterministic flow paths without any need to add an explicit flow ID field as an extra or new field of an encapsulation header. Instead, techniques disclosed herein carry a flow ID as a portion of an existing address field within an encapsulation header. This prevents an expansion in packet size, and also prevents forwarding tables from ballooning. This keeps the processing simpler and more extensible for future use. The transport device then needs only to do a hash on the address field or only a masked portion of the address field. This technique effectively eliminates the need to carry an additional header field.

In one processing stage, the transport edge device 241-1 generates a flow ID and inserts this flow ID into an address space of the encapsulation header. In a second processing stage, the transport edge device 241-1 executes a hash on the flow ID masked within the address space to select a given flow path. Subsequent transport core devices 244 would then execute the same hash function to select a next hop. With the flow ID being the same within the address header, subsequent nodes within the transport network 227 can consistently compute the same respective hash results for selecting a single flow path, such as flow path 217. The hash can be executed on the entire address space or simply on the flow ID masked portion within the address space. By inserting a flow ID within the address space of the encapsulation header, packets do not grow in size nor do forwarding tables grow in size.

Masked bits within an address space can also be used to provide time to live (TTL) the functionality. Time to live functionality is beneficial if there is a control plane that is not functioning properly or to prevent loops that allow packets to circulate endlessly. Conventionally, TTL fields are located within the encapsulation and within user fields, which are deeper within a packet. Typically, transport devices do not look at user fields. Conventional techniques suggest adding an additional field within the encapsulation header to provide time to live data, but this suggestion increases header size and requires sweeping upgrades. Either the address field, or the VLAN-ID field can be used to mask TTL data to provide this functionality without requiring deep packet inspection.

In another embodiment, the VLAN-ID field can be used to identify the masked portions within the source and destination address fields. In other words, the 12-bit VLAN-ID field can be used to indicate the usage of the free bits in the address fields, that is, bits within the VLAN-ID field can be used to indicate which bits are masked and which are not, that is, the structure of the modified address spaces. Each different value of VLAN-ID can represent a separate format for the actual format used. 12 bits of VLAN-ID available allow for up to 4096 different ways of formatting MAC address spaces. Otherwise, each transport node can be configured to know which bits are address bits and which are free/masked bits. Using the VLAN-ID field to indicate masked bits can be a more extensible option because each packet sent in the transport network indicates actual usage of free bits.

Figure 13:
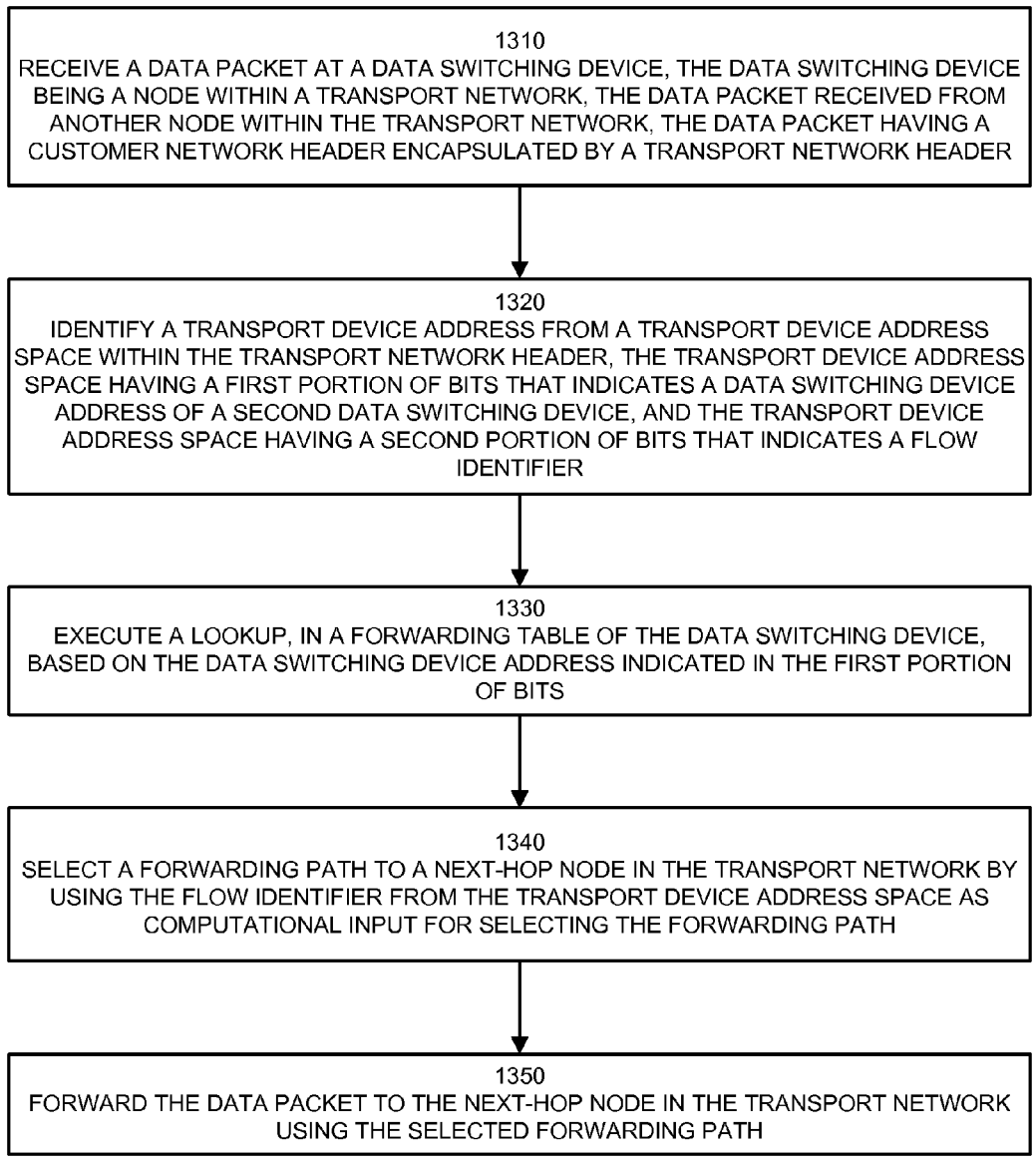
FIGS. 13 is a flowchart illustrating an example of a process supporting ECMP using address masking in a transport network according to embodiments herein.
Figure 14:
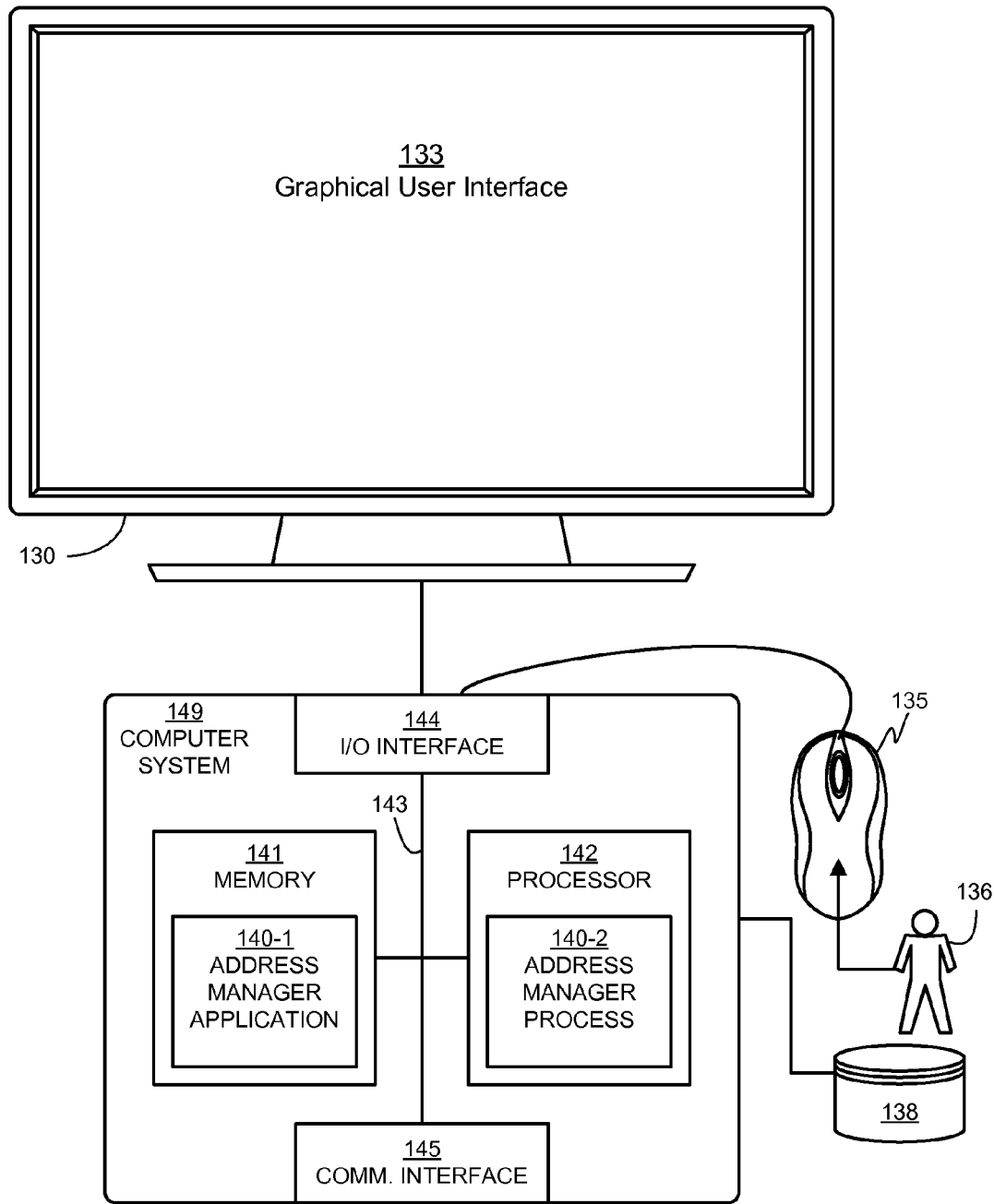
FIG. 14 is an example block diagram of an address manager operating in a computer/network environment according to embodiments herein.

FIG. 14 illustrates an example block diagram of an address manager 140 operating in a computer/network environment according to embodiments herein. Functionality associated with address manager 140 will now be discussed via flowcharts and diagrams in FIG. 6 through FIG. 13. For purposes of the following discussion, the address manager 140 or other appropriate entity performs steps in the flowcharts.

Figure 6:
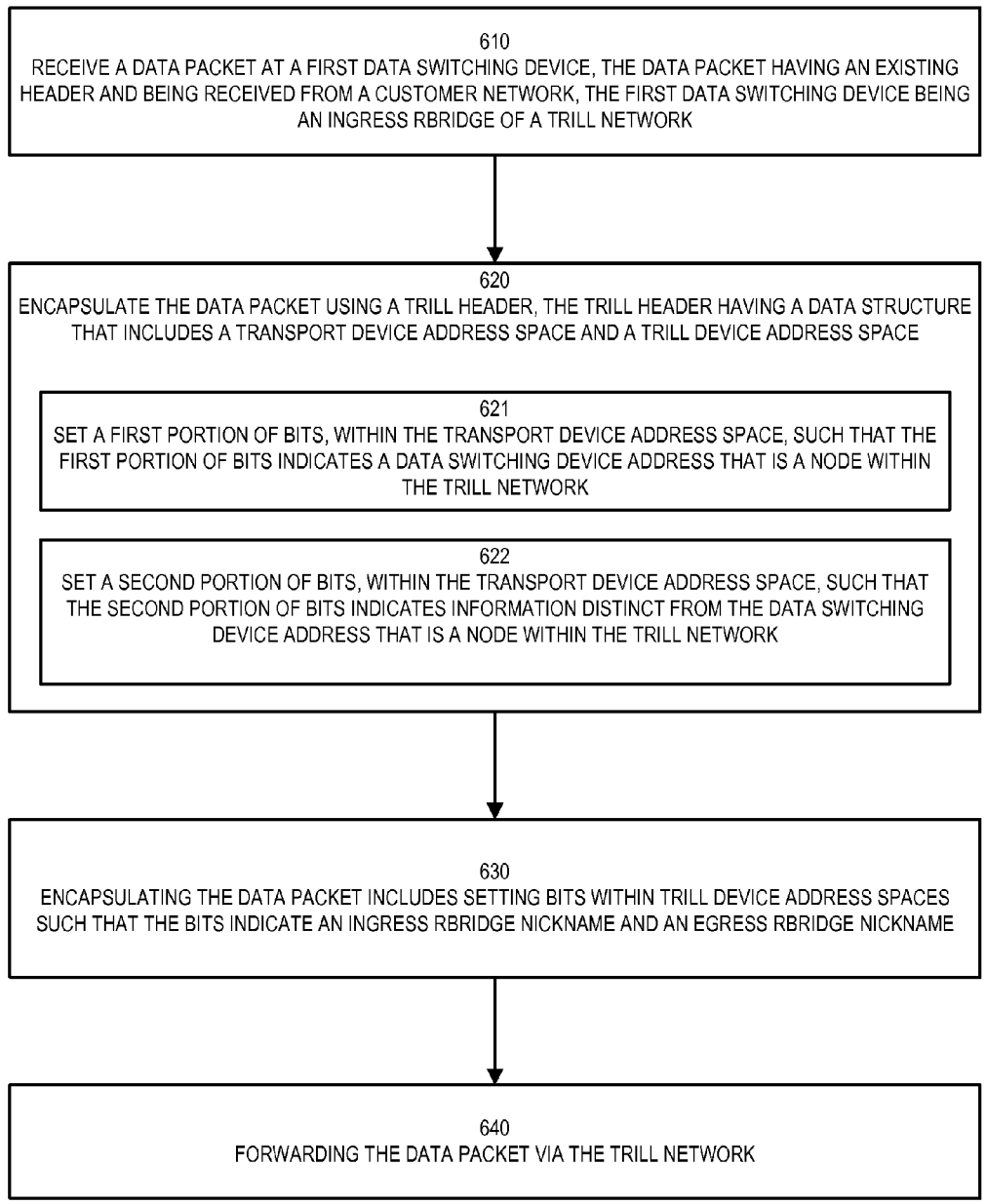
FIGS. 6-8 are flowcharts illustrating an example of a process supporting TRILL header address masking according to embodiments herein.

Now describing embodiments more specifically, FIG. 6 is a flow chart illustrating embodiments disclosed herein. In step 610, address manager 140 receives a data packet at a first data switching device. The data packet has an existing header and is received from a customer network. The first data switching device is an ingress RBridge of a TRILL network, such as node 241-1 of transport network 227.

In step 620, the address manager 140 encapsulates the data packet using a TRILL header. The TRILL header has a data structure that includes a transport device address space and a TRILL device address space, and optionally a Virtual Local Area Network (VLAN) indicator space. For example, the address manager 140 can use TRILL encapsulation. The TRILL header encapsulates a data packet already having an existing header.

In step 621, encapsulating the data packet includes setting a first portion of bits, within the transport device address space, such that the first portion of bits indicates a data switching device address that is a node within the TRILL network. In other words, data is inserted within the transport device address space to indicate a data switching device, such as a router or switch.

In step 622, encapsulating the data packet includes setting a second portion of bits, within the transport device address space, such that the second portion of bits indicates information distinct from the data switching device address that is a node within the TRILL network. Thus, the address manager 140 adds data to the address space that is not used to indicate the local address of TRILL network devices.

In step 630, encapsulating the data packet includes setting bits within TRILL device address spaces such that the bits indicate an ingress RBridge nickname and an egress RBridge nickname.

In step 640, the data switching device forwards the data packet via the TRILL network.

Figure 7:
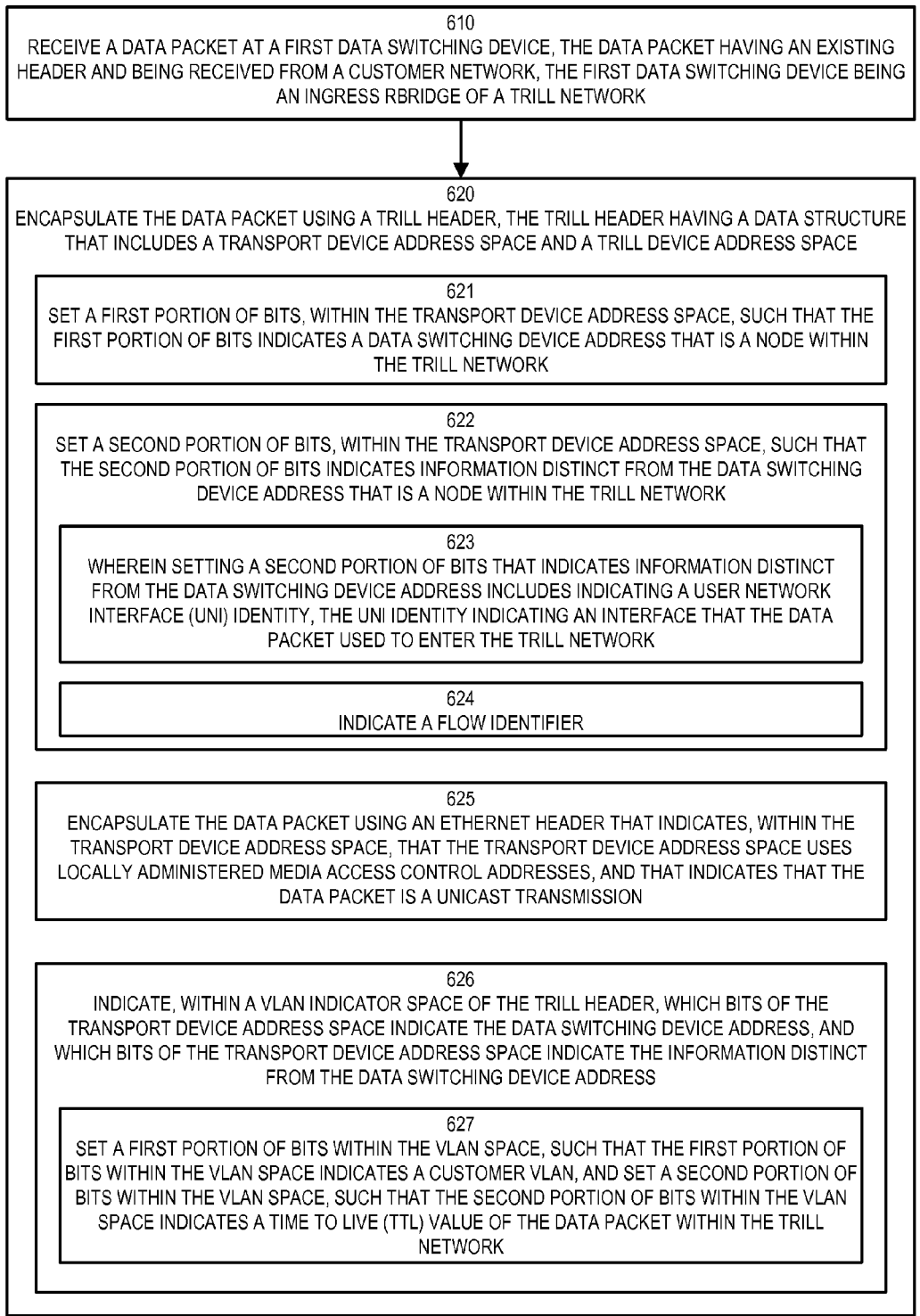
Figure 8:
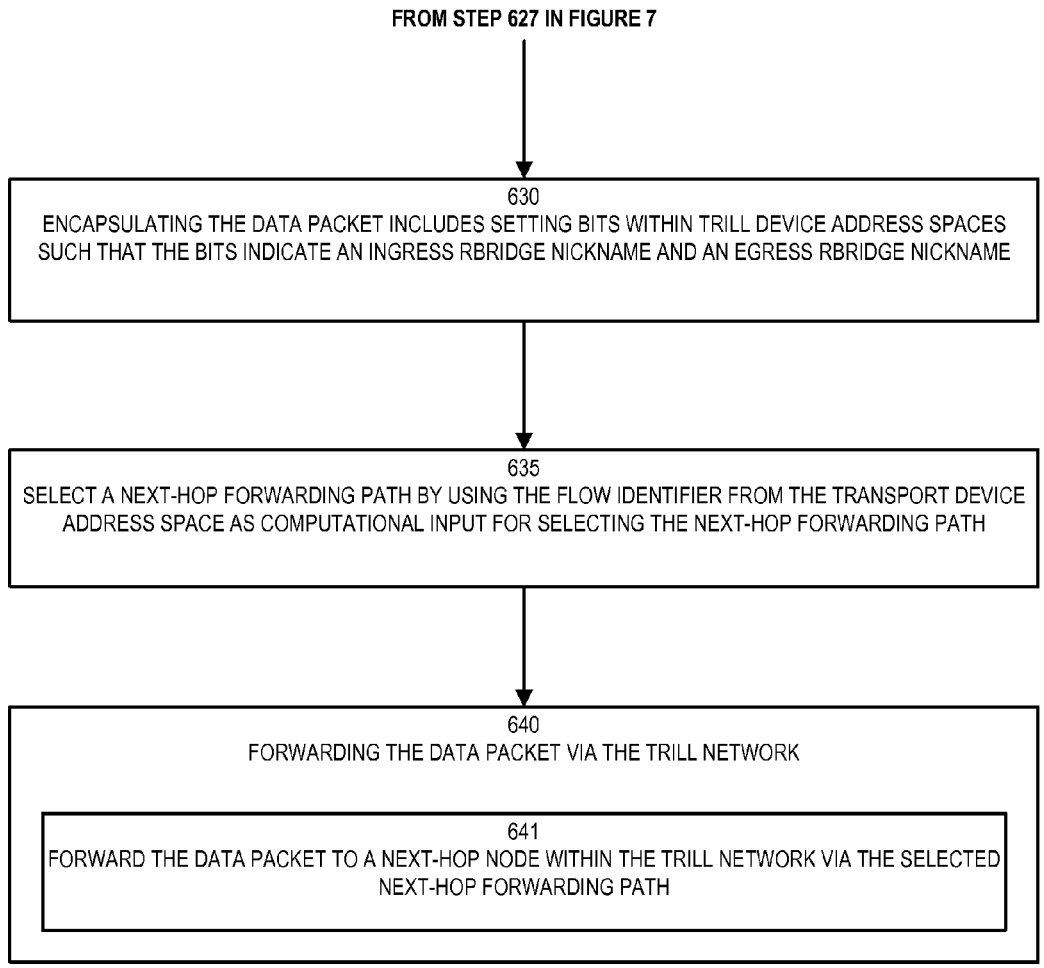

FIGS. 7-8 include a flow chart illustrating additional and/or alternative embodiments and optional functionality of the address manager 140 as disclosed herein.

In step 610, address manager 140 receives a data packet at a first data switching device. The data packet has an existing header and is received from a customer network. The first data switching device is an ingress RBridge of a TRILL network, such as node 241-1 of transport network 227.

In step 620, the address manager 140 encapsulates the data packet using a TRILL header. The TRILL header has a data structure that includes a transport device address space and a TRILL device address space, and optionally a Virtual Local Area Network (VLAN) indicator space.

In step 621, encapsulating the data packet includes setting a first portion of bits, within the transport device address space, such that the first portion of bits indicates a data switching device address that is a node within the TRILL network.

In step 622, encapsulating the data packet includes setting a second portion of bits, within the transport device address space, such that the second portion of bits indicates information distinct from the data switching device address that is a node within the TRILL network.

In step 623, setting the second portion of bits that indicates information distinct from the data switching device address includes indicating a User Network Interface (UNI) identity. This UNI identity can indicate an interface that the data packet used to enter the TRILL network. The data switching device can selects a forwarding path by using the UNI identity from the transport device address space as computational input for selecting the forwarding path. For example, each transport node can use the UNI ID as input for a hashing operation.

In step 624, the address manager indicates a flow identifier using the second portion of bits.

In step 625, encapsulating the data packet includes encapsulating the data packet using an Ethernet header that indicates, within the transport device address space, that the transport device address space uses locally administered Media Access Control addresses. Thus, MAC address do not need to e purchased for use. The encapsulation can also indicate that the data packet is a unicast transmission.

In step 626, the address manager indicates, within a VLAN indicator space of the TRILL header, which bits of the transport device address space indicate the data switching device address, and which bits of the transport device address space indicate the information distinct from the data switching device address. In other words, the information within the VLAN-ID itself of a given packet indicates which bits in the address spaces are free bits.

In step 627, the address manager sets a first portion of bits within the VLAN space, such that the first portion of bits within the VLAN space indicates a customer VLAN. The address manager also sets a second portion of bits within the VLAN space, such that the second portion of bits within the VLAN space indicates a time to live (TTL) value of the data packet within the TRILL network. While TTL data can be included within the address space, sometimes it is desirable to keep data within the address space (masked and non-masked data) as unchanging data throughout the transport network.

In step 630, encapsulating the data packet includes setting bits within TRILL device address spaces such that the bits indicate an ingress RBridge nickname and an egress RBridge nickname. TRILL headers segregate ingress/egress RBridge identification from transport node identification.

In step 635, the address manager selects a next-hop forwarding path by using the flow identifier from the transport device address space as computational input for selecting the next-hop forwarding path. For example, the address manager or data switching devices uses the flow identifier for a hashing operation.

In step 640, the data switching device forwards the data packet via the TRILL network.

In step 641, the data switching device forwards the data packet to a next-hop node within the TRILL network via the selected next-hop forwarding path.

The Ethernet header can include a Media Access Control (MAC) destination address, and a Media Access Control source address. Encapsulating the data packet can include using bits from the MAC destination address and the MAC source address to indicate information distinct from the data switching device addresses. Encapsulating the data packets can also include using bits across both the MAC destination address and the MAC source address to provide additional functionality that requires a greater number of aggregate bits than a single address space can provide.

Figure 9:
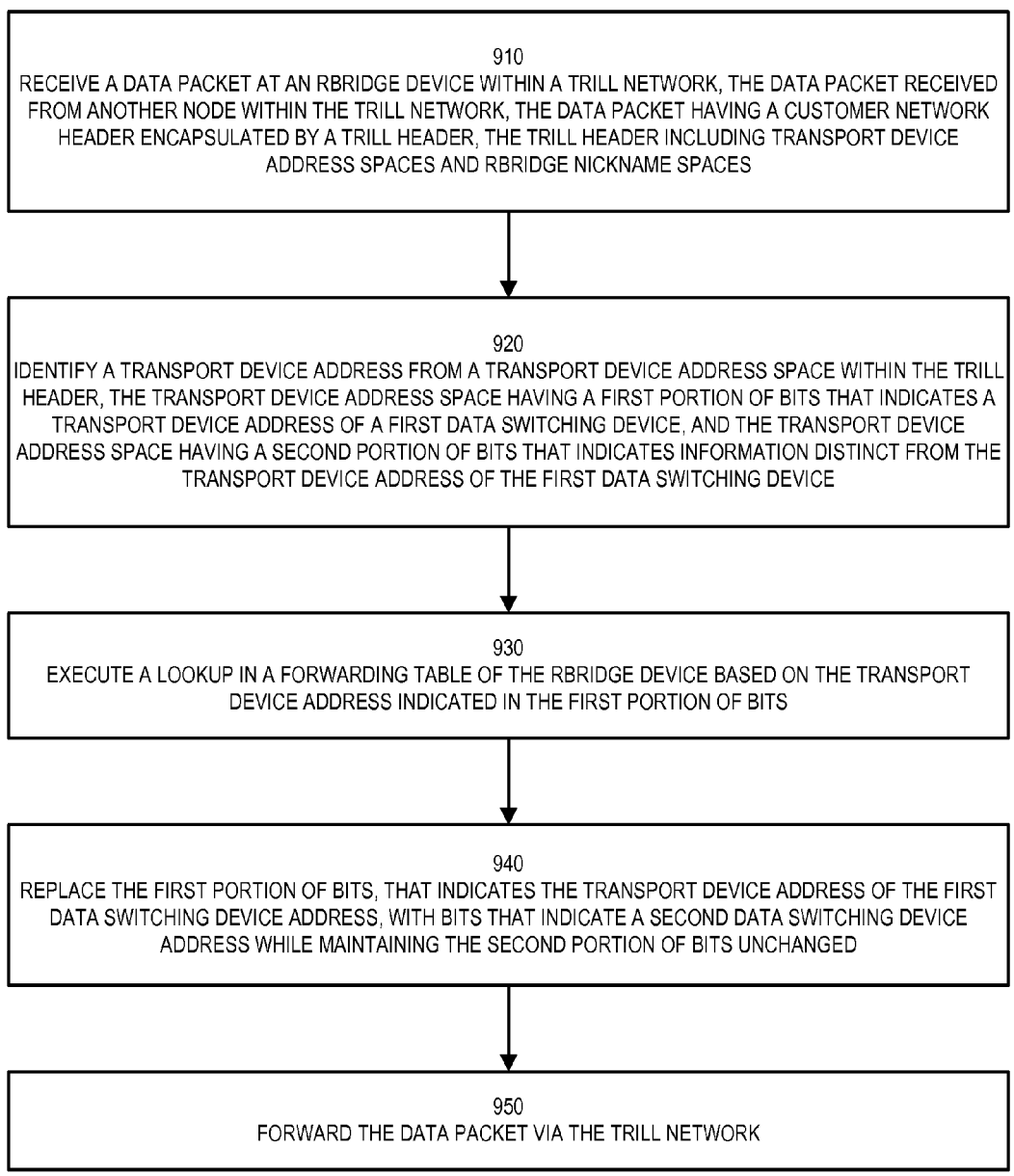

FIG. 9 is a flow chart illustrating embodiments disclosed herein. In step 910, the address manager receives a data packet at an RBridge device within a TRILL. The data packet is received from another node within the TRILL network. The data packet has a customer network header encapsulated by a TRILL header. For example, transport network intermediate RBridge 241-2 receives data packet 207-1.

In step 920, address manager 140 identifies a transport device address from a transport device address space within the TRILL header. The transport device address space has a first portion of bits that indicates a transport device address of a first data switching device. The transport device address space also has a second portion of bits that indicates information distinct from the transport device address of the first data switching device. For example, node 241-2 receives data packet 207-1 having TRILL encapsulation with a portion of MAC address bits being free or masked bits.

In step 930, the data switching device executes a lookup in a forwarding table of the RBridge device based on the transport device address indicated in the first portion of bits, that is, the unmasked portion of the address space.

In step 940, the data switching device replaces the first portion of bits, that indicates the transport device address of the first data switching device address, with bits that indicate a second data switching device address while maintaining the second portion of bits unchanged. For example, an intermediate RBridge swaps a portion of the TRILL header as part of its forwarding process.

In step 940, the data switching device forwards the data packet via the TRILL network.

Figure 11:
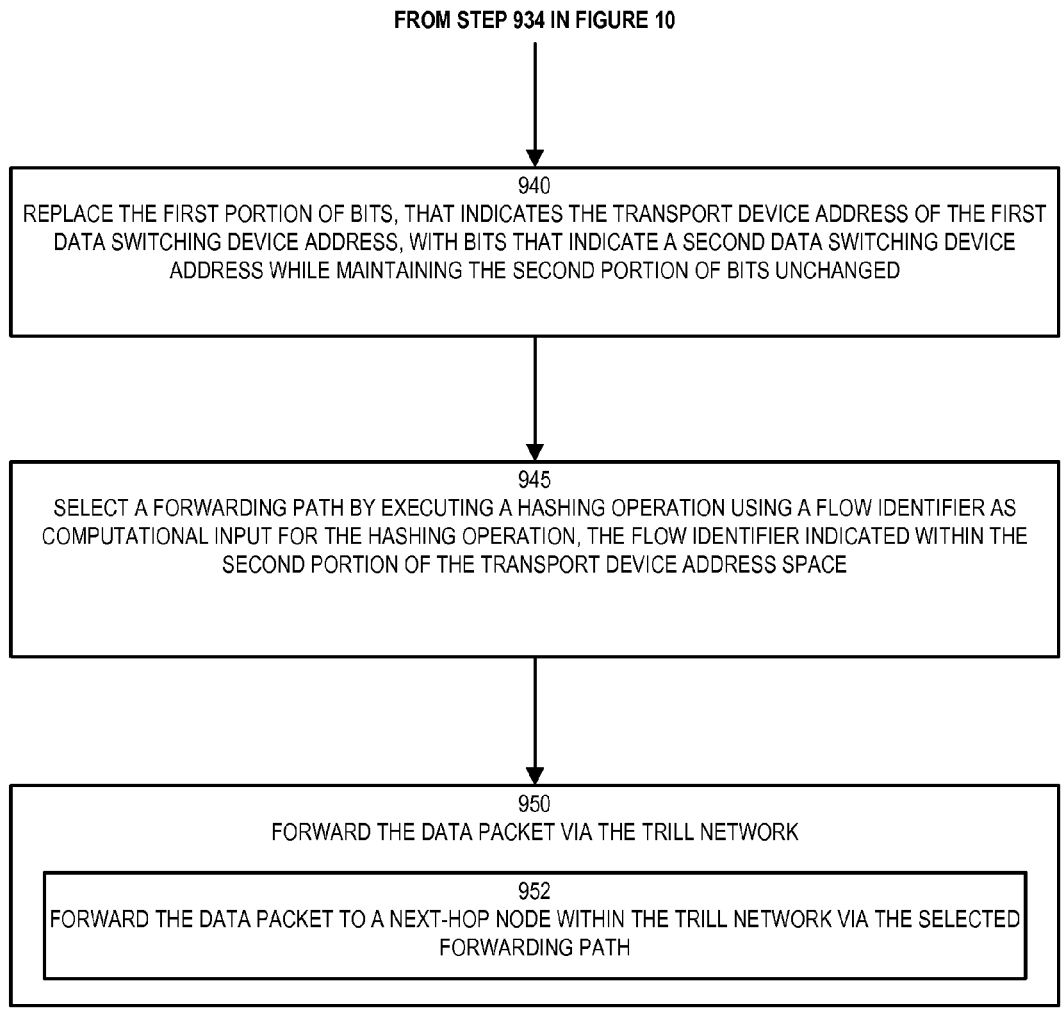

FIGS. 10-11 include a flow chart illustrating additional and/or alternative embodiments and optional functionality of the address manager 140 as disclosed herein. In step 910, the address manager receives a data packet at an RBridge device within a TRILL. The data packet is received from another node within the TRILL network. The data packet has a customer network header encapsulated by a TRILL header.

In step 920, address manager 140 identifies a transport device address from a transport device address space within the TRILL header. The transport device address space has a first portion of bits that indicates a transport device address of a first data switching device. The transport device address space also has a second portion of bits that indicates information distinct from the transport device address of the first data switching device.

In step 922 the transport device address space indicates that the transport device address space uses locally administered Media Access Control (MAC) addresses that are unicast addresses. The transport device address space is an Ethernet header Media Access Control address space having 48 available bits.

In step 924, the data packet uses an Ethernet header that includes a Media Access Control (MAC) destination address space, and a Media Access Control (MAC) source address space, the Ethernet header using bits across both the MAC destination address space and the MAC source address space to indicate information distinct from the data switching device addresses.

In step 930, the data switching device executes a lookup in a forwarding table of the RBridge device based on the transport device address indicated in the first portion of bits.

In step 932, the data switching device masks the second portion of bits within the transport device address space prior to executing the lookup.

In step 934, the address manager 140 identifies the first portion of bits identifying the data switching device address based on information from a Virtual Local Area Network (VLAN) indicator space of the TRILL header.

In step 940, the address manager replaces the first portion of bits, that indicates the transport device address of the first data switching device address, with bits that indicate a second data switching device address while maintaining the second portion of bits unchanged. Thus, when an RBridge swaps or modifies TRILL header information, the masked portion remains in the header or is carried over to a new header instance.

In step 945, the data switching device selects a forwarding path by executing a hashing operation using a flow identifier as computational input for the hashing operation. The flow identifier being indicated within the second portion of the transport device address space.

In step 950, the data switching device forwards the data packet via the TRILL network.

In step 952, the data switching device forwards the data packet to a next-hop node within the TRILL network via the selected forwarding path.

The address manager 140 can also decrement a time to live (TTL) value indicated within a VLAN space of the data packet. The data packet includes a first portion of bits, within the VLAN space of the transport network Ethernet header, which indicates a customer VLAN. The data packet also includes a second portion of bits, within the VLAN space, that indicates the TTL value of the data packet.

As noted above, techniques disclosed herein can be used to support Equal-cost multi-path routing (ECMP) or flow IDs. In data networks when forwarding packets from one point in the network to another, there are often multiple equal cost paths that are available for forwarding the packet on. It is often desirable to be able to exercise all possible paths in the network because such use keeps the network traffic from getting concentrated on any single link, and provides better use of available bandwidth. Devices supporting ECMP need to ensure that the network and devices do not split any given user flow. Splitting a user flow can cause packets to arrive out of order at the destination, which most often results in a severe degradation of network performance and end user experience.

It is also desirable to be able to use Operations, Administration, and Management (OAM) packets to analyze/exercise the same exact path as that taken by data packets belonging to users of the network. This is done for network troubleshooting. If there is a data transport issue, then network operators need to follow the exact path taken by packets associated with the issue. In practice, network operators typically send packets/frames that the network operators originate and transmit to be able to follow an exact path associated with a network issue. If a network operator cannot follow a faulty path, then the network operator's ability to provide a given level of service (quality of service) is compromised. Such operational tools to isolate and fix problems in the network are referred to as OAM or OA&M (Operations, Administration, and Management). For a given issue, a network operator will transmit OAM frames along a path to isolate a data transport issue.

In general, the only information that OAM frames and user data packets have in common in the network is the Network layer addresses. Otherwise user and OAM frames use different protocols. There are different fields in the packet that can be used to identify user flows with varying degrees of granularity. Some examples of such packet fields include Source MAC, Destination MAC, Source IP, Destination IP, Source TCP/UDP port, Destination TCP/UDP port, etc. The more granularity with which user flows can be identified in the network, the more effective ECMP mechanisms would be in distributing the traffic among all possible paths on which they can he forwarded. Architecturally there are two high level models for supporting ECMP within a network: Algorithmic Head End Directed ECMP, and Hop-by-Hop ECMP.

ECMP schemes function more effectively with increasing amounts of granularity in identifying end user flows. In other words, by getting closer to identifying at which node the end user flow cannot be split, the better a corresponding ECMP scheme can be followed.

There are two models for supporting ECMP. On model is algorithmic end-to-end, and the other model is hop-by-hop addressing.

Conventionally, with Algorithmic Head End Directed ECMP, the ingress node of the network pre-computes all available paths in the network from itself to any other node, and assigns a path identifier to each such path. When forwarding a packet between nodes, the path identifier is added to the packet header using rules that ensure that all packets within any single user flow use the exact sane path identifier. The forwarding tables on all the nodes of the network include information on which outgoing interfaces to use for each individual path identifier. All intermediate devices between nodes simply use the path identifier when deciding which outgoing interface to use to forward the packet. Such an approach simplifies processing on intermediate devices which do not need to look beyond the packet header to identify user flows and so do not have to be upgraded as new protocols as introduced, and enables OAM mechanisms to be effective since OAM frames can carry path identifiers. There are several disadvantages, however, to this approach. For example, in networks with lots of links, the number of paths in the network grows exponentially as the number of links in the network grows linearly. This causes an exponential growth in the size of forwarding tables to support all expected path identifiers. It puts a substantial burden on the CPU and the routing protocol implementations because the number of paths that need to be pre-computed is exponentially larger. Additionally, supporting large numbers of path identifiers could require additional fields to be added to the packet, resulting in increased overhead. Thus, such an approach is very impractical to support ECMP in large networks using this mechanism.

Another conventional mechanism is hop-by-hop ECMP path selection, typically performed by hashing at every Hop instead of computing all possible end-to-end choices. Each given ingress node pre-computes all possible next-hop choices from itself to any other directly attached node in the network. The number of potential next hops is relatively small compared to a total number of potential end-to-end paths. The number of next hops is limited to a number of existing links in a given box or device. This number is typically in the hundreds or in the thousands, or even just a handful of links. Each ingress node and every other node that processes the packet on its way between two nodes execute a same path selection process. Each node generates a hash index using different fields in the packet that can be used to identify user flows.

Such hashing involves deep packet inspection to identify user data to do a hashing operation. Typically there is no path identifier in the packet, and so each node identifies user information for use in hashing computations. Note that this should take into account the fact that multiple protocols may be represented in user packets. Each node then uses the generated hash index to select one of the possible next-hops that can be used to reach a subsequent node. Since end-to-end paths are not represented in the forwarding table, the size of the forwarding tables does not grow exponentially as the network grows in size. Instead, growth is linear with respect to the number of devices in the network. Also it is computationally easy on the CPU and routing algorithms since only next-hop choices need to be computed and not all possible end-to-end paths. This computation is linear to the number of links in the network, and not exponential.

Hop-by-hop ECMP hashing, however, requires every device in the network to hash on user fields of each packet. This makes it difficult to handle the addition of new protocols. Also, some protocols use encryption to scramble packet payload, which encryption a transport device cannot be expected to decode. Also, OAM packets cannot be used to troubleshoot paths taken by user data traffic in this network. This is because OAM frames typically use a protocol different from user data packets. Generally, the only thing that OAM frames have in common with user data packets is the network layer address information, but source and destination address do not provide sufficient granularity to be able to take advantage of all available paths in the network between given nodes. Thus, practical implementations are possible but they suffer from the disadvantages mentioned above.

Another conventional mechanism is hop-by-hop ECMP using explicit Flow IDs. The system herein modifies the hop-by hop ECMP scheme defined above by explicitly adding a Flow-ID field is added to packet headers. For example, added immediately after the network layer address. Flow-IDs are a standard way of encoding the possible, user flow information in the packet into a value that can be carried at a well known location in the packet and considered to be part of the network layer information of the packet. The ingress (or first) device in the packet assigns a Flow-ID to the packet based on a computation of the various fields of the packet. This assignment could also be policy based. The ingress node and all subsequent nodes that process the packet make their selection of the next-hop interface based on the value of the Flow-ID. While this is extensible to new protocols and preserves OAM capabilities, such a mechanism increases packet overhead since the Flow-ID is an additional field in the packet, and network devices have to deal with two different packet formats—those with Flow-ID and those without a Flow-ID in the network layer header. This is a significant concern since old protocols remain in use for a seemingly longer than expected, that is, the old protocols do no quickly go away.

Techniques disclosed herein use BMAC address masking to support ECMP functionality. As disclosed above, a portion of an address space is used for a device address, while a second portion (masked or free portion) is used for Flow-IDs. An ingress (edge) node assigns a Flow-ID to every packet it sends into the PBB network. The Flow-ID is then copied into the address space. This can be copied into both the BMAC-SA and BMAC-DA. Once the FLOW-ID is copied into the BMAC address, all PBB network devices that process the packet do a hash of the BMAC-SA and the BMAC-DA to select an outgoing interface from among one of the possible next-hop choices. Alternatively, each node does a hash of the masked Flow-ID field only in the BMAC-SA and BMAC-DA. When the address fields contain additional information, such as UNI-IDs, TTL data, or other data, so that there are three or more segments of data in an address field, then each node can do a hash on any combination of the fields for possible next-hop choices. Thus, techniques disclosed herein avoid layer violation—that is, inspecting headers and other information within the transport network encapsulation. Executing addressing and hashing on the same layer/header information, ensures effective scaling.

Techniques disclosed herein also support Reverse Path Forwarding Check (RPFC) (also known as ingress checking) for loop prevention. Conventional SPB standards have adopted RPFC and the mechanism to prevent/mitigate loops in an SPB network. In practice, for every unicast packet received in the SPB network, a (BVLAN-ID,BMAC-SA) lookup is performed. If the BMAC-SA lookup fails (unknown unicast BMAC-SA), then the packet is discarded. A successful BMAC-SA lookup gives the "expected SPB interface" on which packets with that BMAC-SA are expected to arrive on. If the expected interface is not exactly the same as the actual interface on which the packet actually arrived, then the packet is discarded. For every multicast packet received in the SPB network, (BVLAN-ID,BMAC-DA) lookup is performed. If the BMAC-DA lookup failed (unknown multicast BMAC-DA), then the packet is discarded. Since for SPB multicast, the source is encoded in the BMAC-DA, a successful BMAC-DA lookup gives the expected SPB interface on which packets with that BMAC-DA are expected to arrive on. If the expected interface is not exactly the same as the actual interface on which the packet actually arrives, then the packet is discarded. Interfaces can be identified as expected based on a knowledge of the topology of nodes within the transport network. This topology can be either automatically discovered, or manually configured.

If ECMP is in use, then packets from a given source node in the SPB network can be expected to be received on more than one possible SPB interface. On any given device (node) in the SPB network, the control plane (IS-IS SPB) can compute all the interfaces on which packets from any other device can be received. The unicast RPFC check can be modified when the expected interface is more like a list of interfaces. Thus, RPFC for a given (BVLAN-ID, BMAC-SA) checks if the incoming interface matches any of the list of interfaces on which it is expected to be received on. Note that multicast traffic cannot use ECMP. In other words, for any given destination there are multiple paths, and for any given source, a given node can receive packets from that given source on multiple possible interfaces.

Techniques disclosed herein also support loop suppression using TTL. In general, RPFC is an effective mechanism of preventing and mitigating loops. Sometimes, however, it may be desirable to have another protection in the data path for loop suppression. A Time To Live (TTL) field can be used for that purpose. While TTL does not prevent a loop from being formed, TTL can stop a loop from continuing perpetually. TTL can be useful for cases where the control plane is non-responsive or has suffered a fault. Techniques can include a combination of RPFC and TTL. RPFC can be used to prevent loops from forming (or quickly mitigating if formed), while TTL prevents loops from persisting in the case of a fatal control plane fault (which would not be prevented by RPFC).

Such ECMP support as disclosed herein can be applied to TRILL networks (as explained above), PBB Networks, and other transport networks. A PBB network is a L2-Bridged network that uses Mac-In-Mac encapsulation to transfer user L2 traffic between two or more L2 networks that are located at the edge of the PBB network (provider network). Note that a PBB network includes all networks that use Mac-In-Mac encapsulation technology, including, but not limited to, networks that use the Shortest Path Bridging Technology commonly referred to as SPB or SPBV or SPBM. The PBB network typically includes a Backbone Edge Bridge (BEB) and a Backbone Core Bridge (BCB). BEBs (also known as provider network edge nodes) function as devices that enable transfer of packets to/from interfaces within the PBB network and to/from interfaces outside the PBB network. BCBs (also known as provider core nodes) enable transfer of packets between interfaces that are within the PBB network. Using Mac-In-Mac encapsulation, a given BEB encapsulates a data packet received from a customer network with an Ethernet header for use in the provider network.

Figure 5A:
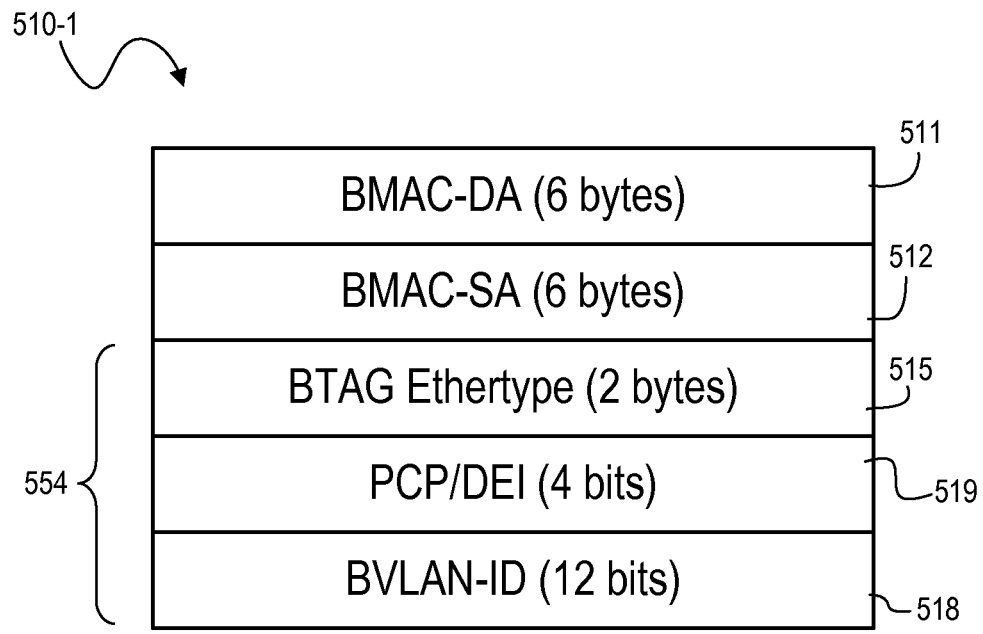
FIGS. 5A and 5B are diagrams illustrating example Mac-In-Mac encapsulation headers for use with ECMP and TTL operations.
Figure 5B:
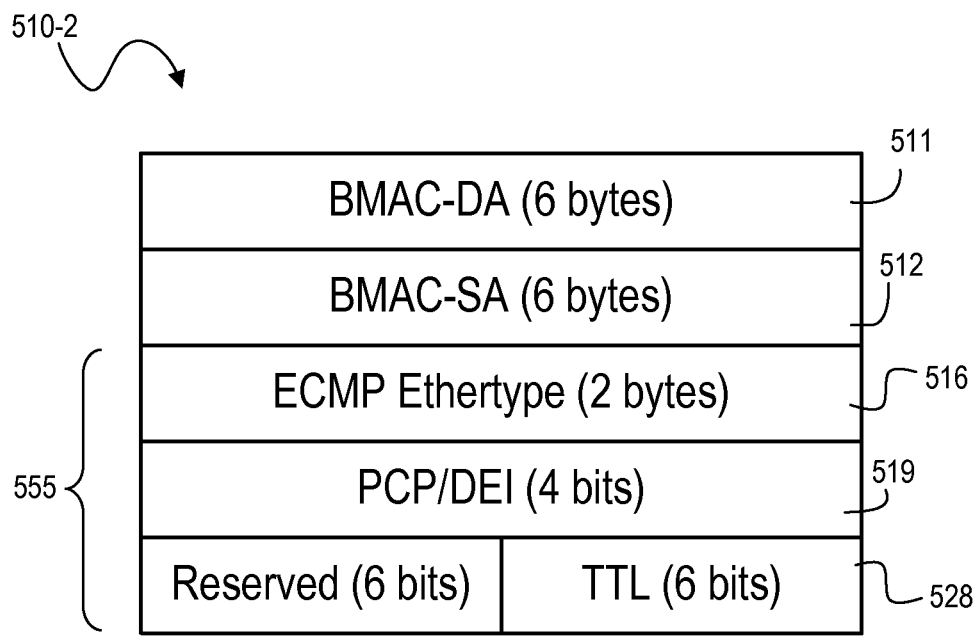

FIG. 5A shows a current PBB Header (Mac-In-Mac encapsulation header). Encapsulation header 510 includes BMAC-DA field 511 (Backbone MAC-DA), BMAC-SA field 512, BTAG Ethertype field 515, PCP/DEI field 519, and BVLAN-ID field 518. Fields 515, 519, and 518 are together known as BTAG 554 fields. Header 510-1 can be modified for combined RPFC and TTL functionality. BTAG 554 can be swapped with a new tag called the ECMP TAG or ETAG 555 in Header 510-2 of FIG. 5B. Field 518 becomes "ECMP Ethertype" 516 (16 bits), while field 528 is segmented with 6 bits reserved (of the 12 available bits) and 6 bits used for TTL data. The size of the TTL and Reserved fields can be changed as long as the two of them together do not take up more than 12 bits. To keep the size of the PBB header from increasing to support the ETAG, the existing BTAG in the PBB header can be replaced with the ETAG. Since both of them are 4 bytes long, it does not result in any net increase in the packet overhead. BMAC-DA and BMAC-SA fields can used masked address formats in conjunction with the ETAG.

Thus, in one embodiment, the address manager uses BMAC masking to free some bits in the BMAC-SA and/or BMAC-DA address spaces. All or a portion of the free bits are set aside for carrying a Flow-ID. The sender BEB performs a hash of the different packet fields and generates a value large enough for a hash index to use all the bits set aside or designated for use as a Flow-ID in the BMAC-SA and/or BMAC-DA address spaces. The address manager then sets the Flow-ID bits in the Mac-In-Mac header using the hash index generated above. The sender BEB and all other BCBs that process the packet on its way to the receiver BEB execute respective ECMP path selection using the Flow-ID that is carried in the Mac-In-Mac address header(s) as part of the BMAC-SA and/or BMAC-DA address spaces. Accordingly, there is no increase in packet size, CFM/OAM packets can effectively troubleshoot paths take by real data packets by including the Flow-ID of customer packets, and the use of masked BMAC addresses ensures that forwarding table sizes to not have to be increased.

Figure 12:
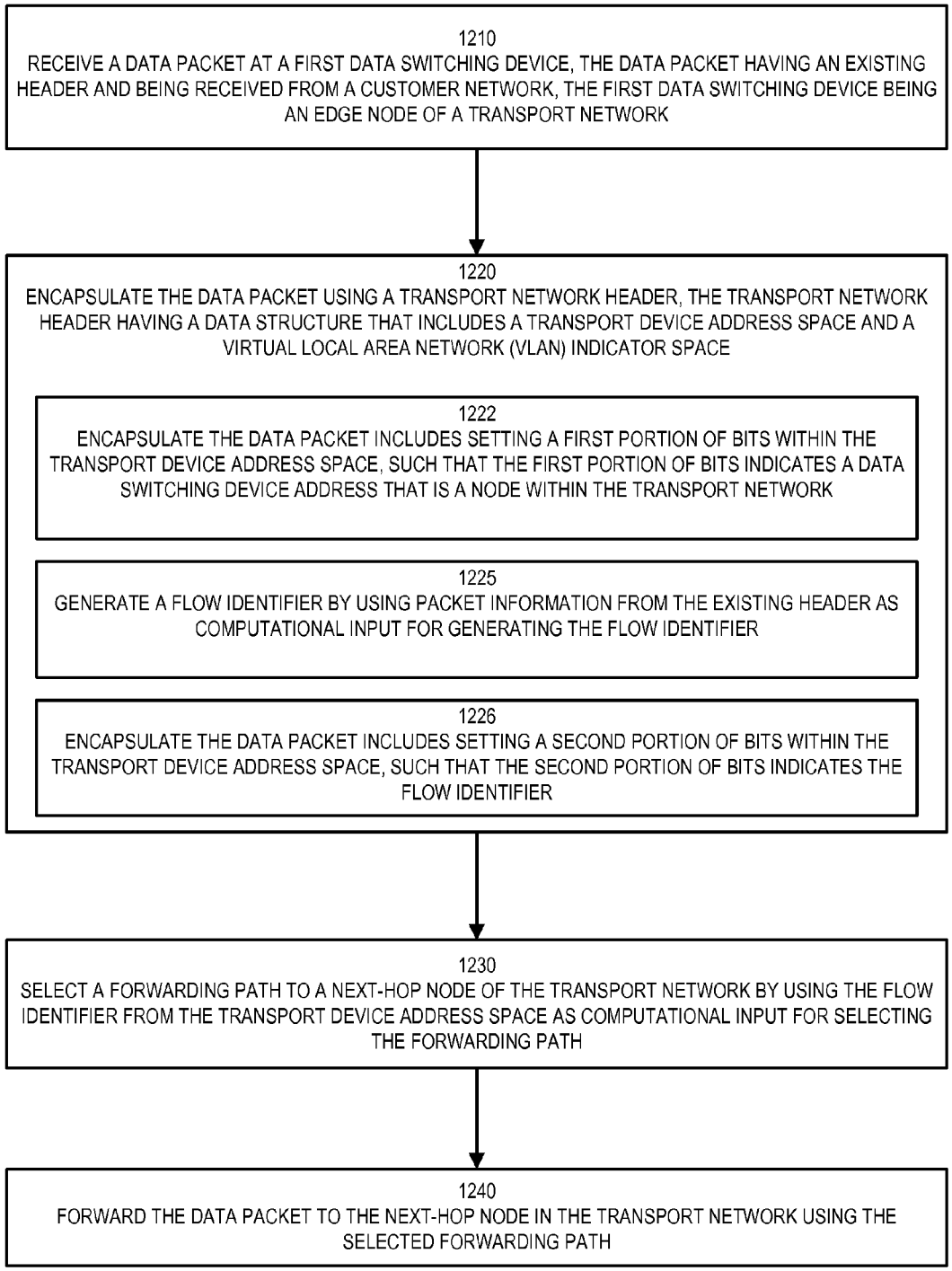
FIG. 12 is a flowchart illustrating an example of a process supporting ECMP using address masking in a transport network according to embodiments herein.

Now describing ECMP embodiments more specifically, FIG. 12 is a flow chart illustrating embodiments disclosed herein. In step 1210, a first data switching device receives a data packet. The data packet has an existing header and is received from a customer network. The first data switching device is an edge node of a transport network, such as a BEB or RBridge or other network switch.

In step 1220, the address manager encapsulates the data packet using a transport network header. The transport network header has a data structure that includes a transport device address space and a virtual local area network (VLAN) indicator space. For example, this can include a MAC address space.

In step 1222, the address manager encapsulates the data packet by setting a first portion of bits within the transport device address space (filling the field with data), such that the first portion of bits indicates a data switching device address that is a node within the transport network.

In step 1225, the address manager generates a flow identifier by using packet information from the existing header as computational input for generating the flow identifier. This can involve deep packet inspection by an edge node to generate the initial flow identifier.

In step 1226, encapsulating the data packet includes setting a second portion of bits within the transport device address space, such that the second portion of bits indicates the flow identifier. Thus, the address manager takes the generated flow identifier and includes this in the transport encapsulation header.

In step 1230, the data switching device selects a forwarding path to a next-hop node of the transport network by using the flow identifier from the transport device address space as computational input for selecting the forwarding path. Thus after generating the initial flow identifier, the data switching device uses this information from the encapsulation header to select a next hop.

In step 1240, the data switching device forwards the data packet to the next-hop node in the transport network using the selected forwarding path.

In other embodiments, generating the flow identifier can include generating a hashing index on customer information identified within the existing header. Encapsulating the data packet can also includes setting a third portion of bits, within the transport device address space, such that the third portion of bits indicates a time to live (TTL) value of the data packet.

In other embodiments, encapsulating the data packet includes setting a first portion of bits within a VLAN space, such that the first portion of bits within the VLAN space indicates a customer VLAN. Encapsulating the data packet then additionally includes setting a second portion of bits within the VLAN space, such that the second portion of bits within the VLAN space indicates a time to live (TTL) of the data packet.

The transport network header can be an Ethernet header that includes a Backbone Media Access Control (MAC) destination address space, and a Backbone Media Access Control source address space. Accordingly, encapsulating the data packet can include using bits from the Backbone MAC destination address space and the Backbone MAC source address space to indicate the flow identifier. Encapsulating the data packet using the Ethernet header can include indicating, within the Backbone MAC space, that the transport device address space uses locally administered Media Access Control addresses. The transport network can be a Provider Backbone Bridge (PBB) network.

In FIG. 13, is a flow chart illustrating embodiments disclosed herein. In step 1310, the data switching device receives a data packet. The data switching device is a node within a transport network. The data packet is received from another node within the transport network. The data packet has a customer network header encapsulated by a transport network header. For example, the data switching device in this embodiment can be a core node or intermediate node within the transport network.

In step 1320, the address manager identifies a transport device address from a transport device address space within the transport network header. The transport device address space has a first portion of bits that indicates a data switching device address of a second data switching device, and the transport device address space has a second portion of bits that indicates a flow identifier.

In step 1330, the data switching device executes a lookup, in a forwarding table of the data switching device, based on the data switching device address indicated in the first portion of bits, that is, based on information extracted from the non-masked portion of the address space.

In step 1340, the data switching device selects a forwarding path to a next-hop node in the transport network by using the flow identifier from the transport device address space as computational input for selecting the forwarding path, such as via a hashing operation.

In step 1350, the data switching device forwards the data packet to the next-hop node in the transport network using the selected forwarding path.

In other embodiments, executing the lookup in the forwarding table of the data switching device includes executing a reverse path forwarding (RPF) check. The RPF check can include discarding the data packet in response to identifying that the data packet was received from an interface that does not match any incoming interface on a list of expected incoming interfaces for the data switching device in the transport network. In certain transport networks, the expected interface can include multiple potential interfaces. Thus the data switching device can compare the received interface to the list to identify a match. If there is a match then the data switching device continues with forwarding operations. If there is no match then the packet is discarded.

In another embodiment, the data packet includes a third portion of bits within the transport device address space (or VLAN-ID field). This third portion of bits within the transport device address space indicates a time to live (TTL) value of the data packet. The data switching device the decrements the TTL value indicated within the transport device address space before forwarding. Selecting the forwarding path to a next-hop node can include providing Equal-cost multi-path routing (ECMP) using the using the flow identifier indicated by the a second portion of bits in the transport device address space. Thus embodiments can combine ECMP functionality with RPF checks and TTL protection at the same time.

Continuing with FIG. 14, the following discussion provides a basic embodiment indicating how to carry out functionality associated with the address manager 140 as discussed above. It should be noted, however, that the actual configuration for carrying out the address manager 140 can vary depending on a respective application. For example, computer system 149 can include one or multiple computers that carry out the processing as described herein.

In different embodiments, computer system 149 may be any of various types of devices, including, but not limited to, a network switch, a router, a cell phone, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the address manager 140 of computer system 149 to communicate over a network and, if necessary, retrieve any data required to create views, process content, communicate with a user, etc. according to embodiments herein.

As shown, memory system 141 is encoded with address manager 140-1 that supports functionality as discussed above and as discussed further below. Address manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the address manager 140-1. Execution of the address manager 140-1 produces processing functionality in address manager process 140-2. In other words, the address manager process 140-2 represents one or more portions of the address manager 140 performing within or upon the processor 142 in the computer system 149.

It should be noted that, in addition to the address manager process 140-2 that carries out method operations as discussed herein, other embodiments herein include the address manager 140-1 itself (i.e., the un-executed or non-performing logic instructions and/or data). The address manager 140-1 may be stored on a non-transitory, tangible computer-readable storage medium including computer readable storage media such as floppy disk, hard disk, optical medium, etc. According to other embodiments, the address manager 140-1 can also be stored in a memory type system such as in firmware, read only memory (ROM), or, as in this example, as executable code within the memory system 141.

In addition to these embodiments, it should also be noted that other embodiments herein include the execution of the address manager 140-1 in processor 142 as the address manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for packet switching in a Transparent Interconnect of Lots of Links (TRILL) network, the computer-implemented method comprising:
   receiving a data packet at a first data switching device, the data packet having an existing header and being received from a customer network, the first data switching device being an ingress RBridge of a TRILL network;
   encapsulating the data packet using a TRILL header, the TRILL header having a data structure that includes a transport device address space and a TRILL device address space;
   encapsulating the data packet includes setting a first portion of bits, within the transport device address space, such that the first portion of bits indicates a data switching device address that is a node within the TRILL network;
   encapsulating the data packet includes setting a second portion of bits, within the transport device address space, such that the second portion of bits indicates information distinct from the data switching device address that is a node within the TRILL network;
   encapsulating the data packet includes setting bits within TRILL device address spaces such that the bits indicate an ingress RBridge nickname and an egress RBridge nickname; and
   forwarding the data packet via the TRILL network.

2. The computer-implemented method of claim 1, wherein encapsulating the data packet using the TRILL header includes encapsulating the data packet using an Ethernet header;
   wherein encapsulating the data packet using the Ethernet header includes indicating, within the transport device address space, that the transport device address space uses locally administered Media Access Control addresses; and
   wherein encapsulating the data packet using the Ethernet header includes indicating, within the transport device address space, that the data packet is a unicast transmission.

3. The computer-implemented method of claim 1, wherein the data structure of the TRILL header is an Ethernet header that includes a virtual local area network (VLAN) indicator space;
   wherein encapsulating the data packet using the TRILL header includes encapsulating the data packet using the Ethernet header; and
   wherein encapsulating the data packet using the Ethernet header includes indicating, within the VLAN indicator space, which bits of the transport device address space indicate the data switching device address, and which bits of the transport device address space indicate the information distinct from the data switching device address.

4. The computer-implemented method of claim 1, wherein setting a second portion of bits that indicates information distinct from the data switching device address includes indicating a User Network Interface (UNI) identity, the UNI identity indicating an interface that the data packet used to enter the TRILL network.

5. The computer-implemented method of claim 1, further comprising:
   wherein setting the second portion of bits, within the transport device address space, that indicates information distinct from the data switching device address includes indicating a flow identifier;
   selecting a next-hop forwarding path by using the flow identifier from the transport device address space as computational input for selecting the next-hop forwarding path; and
   wherein forwarding the data packet via the TRILL network includes forwarding the data packet to a next-hop node within the TRILL network via the selected next-hop forwarding path.

6. The computer-implemented method of claim 1, further comprising:
   wherein encapsulating the data packet includes setting a first portion of bits within the VLAN space, such that the first portion of bits within the VLAN space indicates a customer VLAN; and
   wherein encapsulating the data packet includes setting a second portion of bits within the VLAN space, such that the second portion of bits within the VLAN space indicates a time to live (TTL) value of the data packet within the TRILL network.

7. The computer-implemented method of claim 1, encapsulating the data packet using the TRILL header includes encapsulating the data packet using an Ethernet header;
   wherein the Ethernet header includes a Media Access Control (MAC) destination address space, and a Media Access Control (MAC) source address space; and
   wherein encapsulating the data packet includes using bits from the MAC destination address space and from the MAC source address space such that the aggregate bits across the MAC destination address space and the MAC source address space indicate information distinct from data switching device addresses.

8. A computer program product including a non-transitory computer-storage medium having instructions stored thereon for processing data information, such that the instructions, when carried out by a processing device, cause the processing device to perform the operations of:
   receiving a data packet at a first data switching device, the data packet having an existing header and being received from a customer network, the first data switching device being an ingress RBridge of a TRILL network;
   encapsulating the data packet using a TRILL header, the TRILL header having a data structure that includes a transport device address space and a TRILL device address space;
   encapsulating the data packet includes setting a first portion of bits, within the transport device address space, such that the first portion of bits indicates a data switching device address that is a node within the TRILL network;
   encapsulating the data packet includes setting a second portion of bits, within the transport device address space, such that the second portion of bits indicates information distinct from the data switching device address that is a node within the TRILL network;
   encapsulating the data packet includes setting bits within TRILL device address spaces such that the bits indicate an ingress RBridge nickname and an egress RBridge nickname; and
   forwarding the data packet via the TRILL network.

9. A computer-implemented method for packet switching in a Transparent Interconnect of Lots of Links (TRILL) network, the computer-implemented method comprising:
   receiving a data packet at an RBridge device within a TRILL network, the data packet received from another node within the TRILL network, the data packet having a customer network header encapsulated by a TRILL header, the TRILL header including transport device address spaces and RBridge nickname spaces;
   identifying a transport device address from a transport device address space within the TRILL header, the transport device address space having a first portion of bits that indicates a transport device address of a first data switching device, and the transport device address space having a second portion of bits that indicates information distinct from the transport device address of the first data switching device;
   executing a lookup in a forwarding table of the RBridge device based on the transport device address indicated in the first portion of bits;
   replacing the first portion of bits, that indicates the transport device address of the first data switching device address, with bits that indicate a second data switching device address while maintaining the second portion of bits unchanged; and
   forwarding the data packet via the TRILL network.

10. The computer-implemented method of claim 9, wherein executing the lookup includes masking the second portion of bits within the transport device address space prior to executing the lookup.

11. The computer-implemented method of claim 9, wherein executing the lookup includes identifying the first portion of bits that indicates the transport device address of a first data switching device based on information from a virtual local area network (VLAN) indicator space of the TRILL header.

12. The computer-implemented method of claim 9, wherein the transport device address space indicates that the transport device address space uses locally administered Media Access Control (MAC) addresses that are unicast addresses, the transport device address space being an Ethernet header Media Access Control address space having 48 available bits.

13. The computer-implemented method of claim 9, further comprising:
   selecting a forwarding path by executing a hashing operation using a flow identifier as computational input for the hashing operation, the flow identifier indicated within the second portion of the transport device address space; and
   wherein forwarding the data packet via the TRILL network includes forwarding the data packet to a next-hop node within the TRILL network via the selected forwarding path.

14. The computer-implemented method of claim 9, wherein the data packet encapsulated by the TRILL header includes the data packet using an Ethernet header that includes a Media Access Control (MAC) destination address space, and a Media Access Control (MAC) source address space, the Ethernet header using bits across both the MAC destination address space and the MAC source address space to indicate information distinct from the data switching device addresses.

15. A computer-implemented method for packet switching in a transport network, the computer-implemented method comprising:
   receiving a data packet at a first data switching device, the data packet having an existing header and being received from a customer network, the first data switching device being an edge node of a transport network;
   encapsulating the data packet using a transport network header, the transport network header having a data structure that includes a transport device address space and a virtual local area network (VLAN) indicator space;
   encapsulating the data packet includes setting a first portion of bits within the transport device address space, such that the first portion of bits indicates a data switching device address that is a node within the transport network;
   encapsulating the data packet includes setting a second portion of bits within the transport device address space, such that the second portion of bits indicates a flow identifier;
   selecting a forwarding path to a next-hop node of the transport network by using the flow identifier from the transport device address space as computational input for selecting the forwarding path; and
   forwarding the data packet to the next-hop node in the transport network using the selected forwarding path.

16. The computer-implemented method of claim 15, further comprising:

generating the flow identifier by using packet information from the existing header as computational input for generating the flow identifier.

17. The computer-implemented method of claim 16, wherein generating the flow identifier includes generating a hashing index on customer information identified within the existing header.

18. The computer-implemented method of claim 17, wherein encapsulating the data packet includes setting a third portion of bits, within the transport device address space, such that the third portion of bits indicates a time to live (TTL) value of the data packet.

19. The computer-implemented method of claim 16, further comprising:
wherein encapsulating the data packet includes setting a first portion of bits within the VLAN space, such that the first portion of bits within the VLAN space indicates a customer VLAN; and
wherein encapsulating the data packet includes setting a second portion of bits within the VLAN space, such that the second portion of bits within the VLAN space indicates a time to live (TTL) of the data packet.

20. The computer-implemented method of claim 15, further comprising:
wherein the transport network header is an Ethernet header that includes a Backbone Media Access Control (MAC) destination address space, and a Backbone Media Access Control source address space;
wherein encapsulating the data packet includes using bits from the Backbone MAC destination address space and the Backbone MAC source address space to indicate the flow identifier;
wherein encapsulating the data packet using the Ethernet header includes indicating, within the Backbone MAC space, that the transport device address space uses locally administered Media Access Control addresses; and
wherein the transport network is a Provider Backbone Bridge (PBB) network.

21. A computer program product including a non-transitory computer-storage medium having instructions stored thereon for processing data information, such that the instructions, when carried out by a processing device, cause the processing device to perform the operations of:
receiving a data packet at a first data switching device, the data packet having an existing header and being received from a customer network, the first data switching device being an edge node of a transport network;
encapsulating the data packet using a transport network header, the transport network header having a data structure that includes a transport device address space and a virtual local area network (VLAN) indicator space;
encapsulating the data packet includes setting a first portion of bits within the transport device address space, such that the first portion of bits indicates a data switching device address that is a node within the transport network;
encapsulating the data packet includes setting a second portion of bits within the transport device address space, such that the second portion of bits indicates a flow identifier;
selecting a forwarding path to a next-hop node of the transport network by using the flow identifier from the transport device address space as computational input for selecting the forwarding path; and
forwarding the data packet to the next-hop node in the transport network using the selected forwarding path.

22. A computer-implemented method for packet switching in a transport network, the computer-implemented method comprising:
receiving a data packet at a data switching device, the data switching device being a node within a transport network, the data packet received from another node within the transport network, the data packet having a customer network header encapsulated by a transport network header;
identifying a transport device address from a transport device address space within the transport network header, the transport device address space having a first portion of bits that indicates a data switching device address of a second data switching device, and the transport device address space having a second portion of bits that indicates a flow identifier;
executing a lookup, in a forwarding table of the data switching device, based on the data switching device address indicated in the first portion of bits;
selecting a forwarding path to a next-hop node in the transport network by using the flow identifier from the transport device address space as computational input for selecting the forwarding path; and
forwarding the data packet to the next-hop node in the transport network using the selected forwarding path.

23. The computer-implemented method of claim 22, further comprising:
wherein executing the lookup in the forwarding table of the data switching device includes executing a reverse path forwarding (RPF) check, the RPF check comprising:
discarding the data packet in response to identifying that the data packet was received from an interface that does not match any incoming interface on a list of expected incoming interfaces for the data switching device in the transport network.

24. The computer-implemented method of claim 23, wherein the data packet includes a third portion of bits within the transport device address space, the third portion of bits within the transport device address space indicating a time to live (TTL) value of the data packet; and
decrementing the TTL value indicated within the transport device address space.

25. The computer-implemented method of claim 24, wherein selecting the forwarding path to a next-hop node includes providing Equal-cost multi-path routing (ECMP) using the using the flow identifier indicated by the a second portion of bits in the transport device address space.

* * * * *